(12) United States Patent
Harris

(10) Patent No.: US 10,156,265 B2
(45) Date of Patent: Dec. 18, 2018

(54) ARTICULATING TORSIONAL COUPLING

(71) Applicant: Harris Dynamics, Sunland, CA (US)

(72) Inventor: Trevor L. Harris, Sunland, CA (US)

(73) Assignee: Harris Dynamics, Sunland, CA (US)

( * ) Notice: Subject to any disclaimer, the term of this patent is extended or adjusted under 35 U.S.C. 154(b) by 0 days.

(21) Appl. No.: 15/304,241

(22) PCT Filed: Oct. 9, 2015

(86) PCT No.: PCT/US2015/055011
§ 371 (c)(1),
(2) Date: Oct. 14, 2016

(87) PCT Pub. No.: WO2016/057967
PCT Pub. Date: Apr. 14, 2016

(65) Prior Publication Data
US 2017/0204912 A1    Jul. 20, 2017

Related U.S. Application Data

(60) Provisional application No. 62/061,927, filed on Oct. 9, 2014.

(51) Int. Cl.
*F16D 3/30* (2006.01)

(52) U.S. Cl.
CPC ............. *F16D 3/30* (2013.01); *Y10S 464/904* (2013.01)

(58) Field of Classification Search
CPC ................................ F16D 3/30; Y10S 464/904
USPC ................................................. 464/112–114
See application file for complete search history.

(56) References Cited

U.S. PATENT DOCUMENTS

| | | |
|---|---|---|
| 96,395 A | 11/1869 | Clemens |
| 125,880 A | 4/1872 | Clemens |
| 125,881 A | 4/1872 | Clemens |
| 2,086,549 A | 7/1937 | Harris |
| 2,206,291 A | 7/1940 | Nelson |
| 3,263,447 A | 8/1966 | Baker |
| 3,347,214 A | 10/1967 | Plagmann |
| 3,411,324 A | 11/1968 | Federline |
| 3,456,458 A | 7/1969 | Dixon |
| 3,477,249 A | 11/1969 | Culver |
| 3,517,528 A | 6/1970 | Eccher |
| 3,538,721 A | 11/1970 | Reddy |

(Continued)

FOREIGN PATENT DOCUMENTS

| | | |
|---|---|---|
| AU | 2008202059 A1 | 5/2008 |
| DE | 1253338 B | 11/1967 |

(Continued)

OTHER PUBLICATIONS

Extended European Search Report, Application No. 16201657.0, dated Feb. 23, 2017.

(Continued)

*Primary Examiner* — Greg Binda
(74) *Attorney, Agent, or Firm* — MacMillan, Sobanski & Todd, LLC

(57) ABSTRACT

A constant velocity joint having driving and driven pivot arm segments coupled together with a pivotal bearing element provides high power density transmission through a large dynamic angle. The constant velocity joint may be configured for axial movement, such as a plunge capability, or may be a fixed center joint.

15 Claims, 25 Drawing Sheets

(56) References Cited

U.S. PATENT DOCUMENTS

| | | |
|---|---|---|
| 3,712,081 A | 1/1973 | Philipp et al. |
| 3,739,600 A | 6/1973 | Pere |
| 3,965,700 A | 6/1976 | Nicoletti |
| 4,036,032 A | 7/1977 | Durum |
| 4,086,787 A | 5/1978 | Koch |
| 4,208,889 A | 6/1980 | Peterson |
| 4,501,571 A | 2/1985 | Orain |
| 4,547,177 A | 10/1985 | Ueno |
| 4,878,393 A | 11/1989 | Duta et al. |
| 5,048,622 A | 9/1991 | Ide |
| 5,186,686 A * | 2/1993 | Staples .................. B64C 27/35 464/904 |
| 5,979,264 A | 11/1999 | Rosheim |
| 6,026,703 A | 2/2000 | Stanisic et al. |
| 6,692,363 B1 | 2/2004 | Heutschi et al. |
| 7,472,622 B2 | 1/2009 | Isobe et al. |
| 7,846,030 B2 | 12/2010 | Cornay et al. |
| 8,590,833 B2 | 11/2013 | Rauber et al. |
| 2002/0183122 A1 | 12/2002 | Sone et al. |
| 2006/0128478 A1 | 6/2006 | Carden |
| 2006/0217206 A1 | 9/2006 | Thompson |
| 2008/0028881 A1 | 2/2008 | Sone et al. |
| 2012/0094775 A1 | 4/2012 | Yaghoubi et al. |

FOREIGN PATENT DOCUMENTS

| | | | | |
|---|---|---|---|---|
| DE | 3306746 A1 | | 2/1984 | |
| FR | 1.07.613 | * | 7/1955 | .................. 464/113 |
| FR | 1.097.613 | * | 7/1955 | .................. 464/113 |
| GB | 2174477 A | | 11/1986 | |
| JP | H11108074 A | | 4/1999 | |
| WO | 9936707 A1 | | 7/1999 | |
| WO | 0046522 A1 | | 8/2000 | |
| WO | 2004005735 A1 | | 1/2004 | |
| WO | 2013/002743 A1 | | 1/2013 | |

OTHER PUBLICATIONS

PCT International Search Report and the Written Opinion, Application No. PCT/US2015/055011 filed Oct. 9, 2015, dated Apr. 19, 2016.

Ross-Hime Designs, Inc., 'Super Seeker Gimbal', 25 Years of Innovative Robotics, Web Article accessed 2016, http://www.anthrobot.com/.

EPO, Communication under Rule 71(3), Application No. 16201657.0, dated Sep. 28, 2017.

* cited by examiner

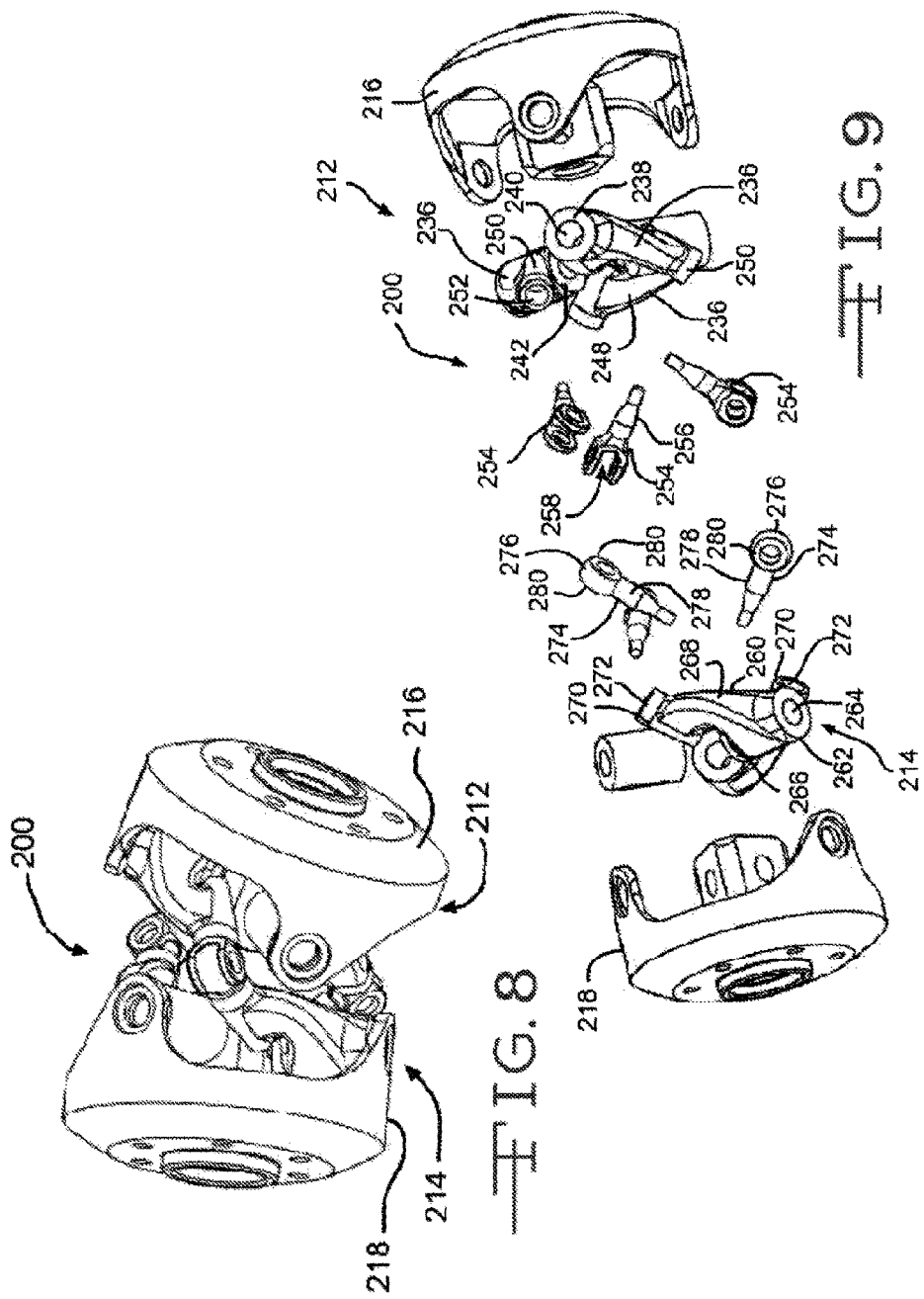

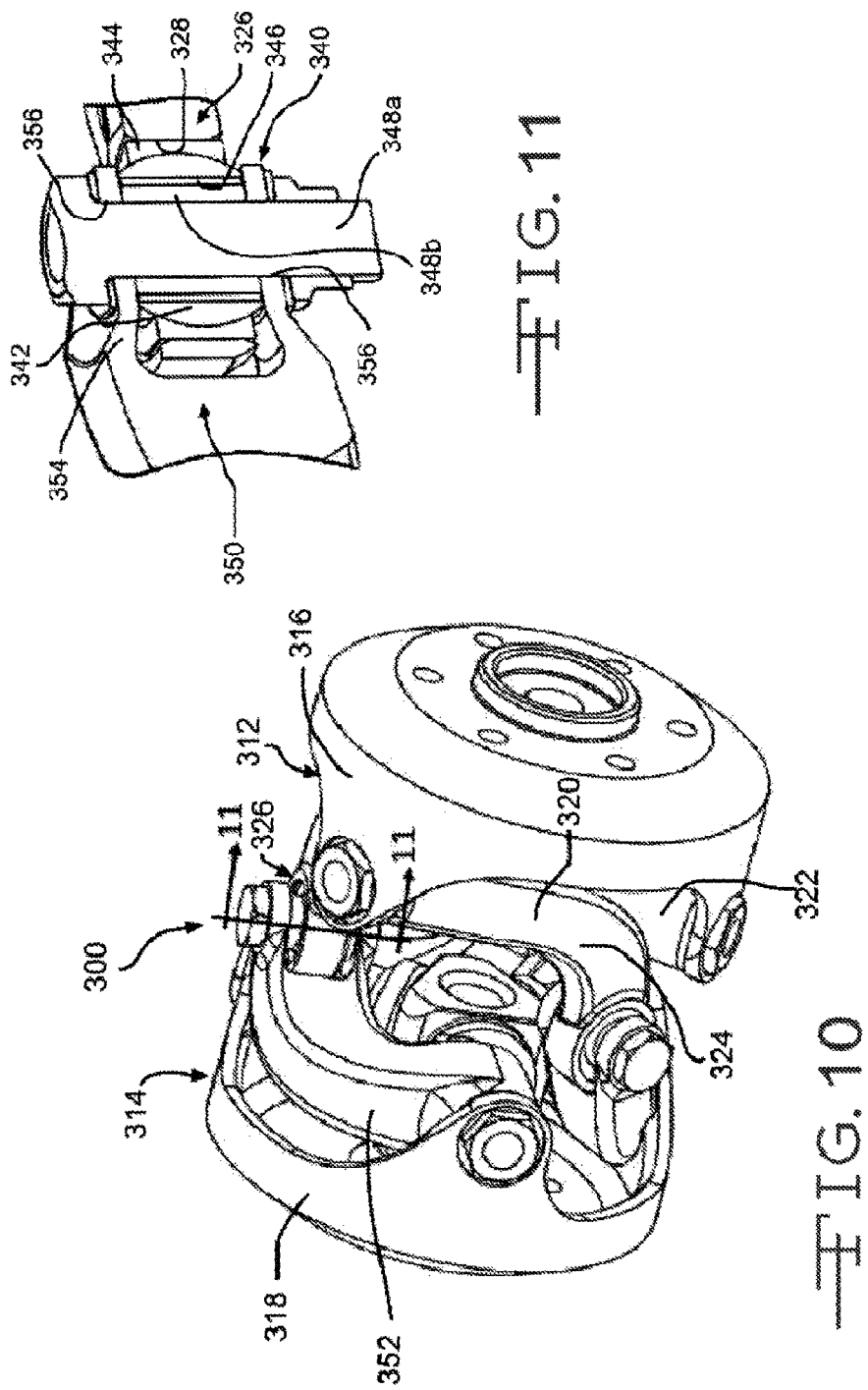

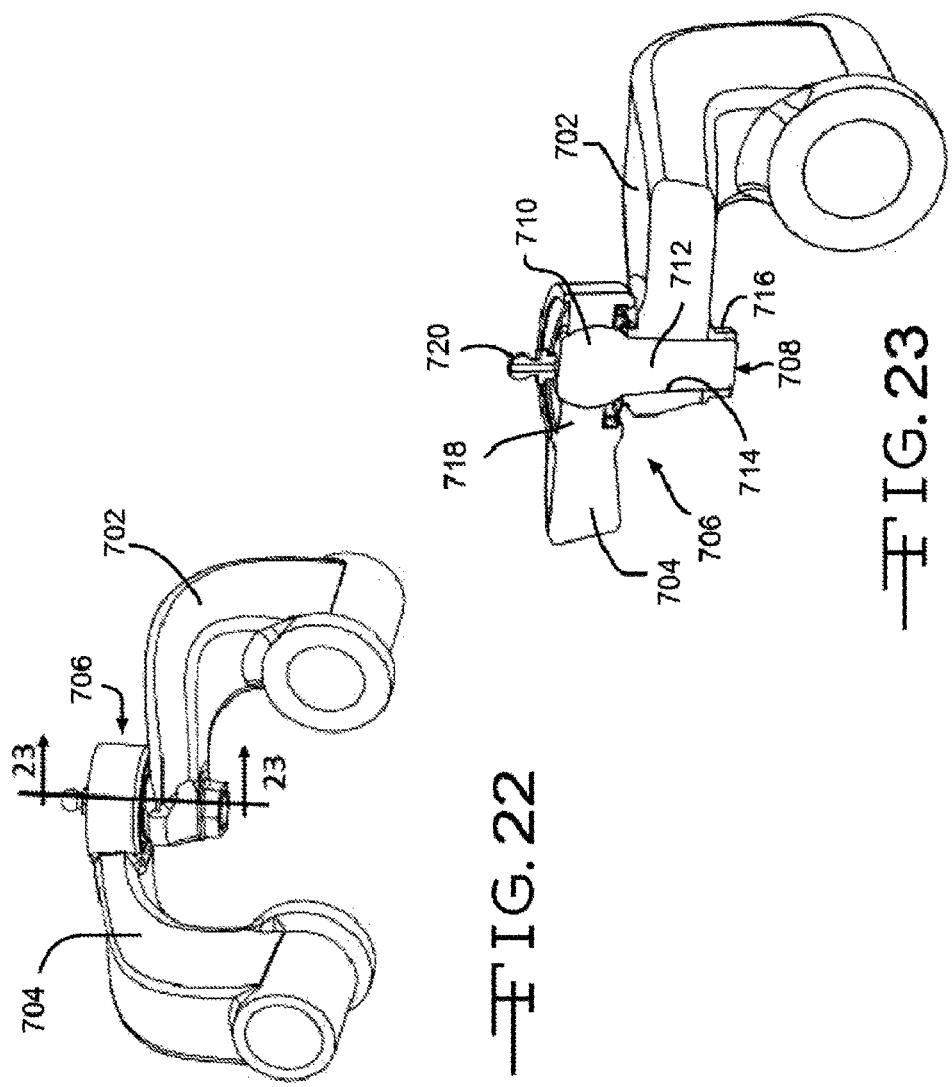

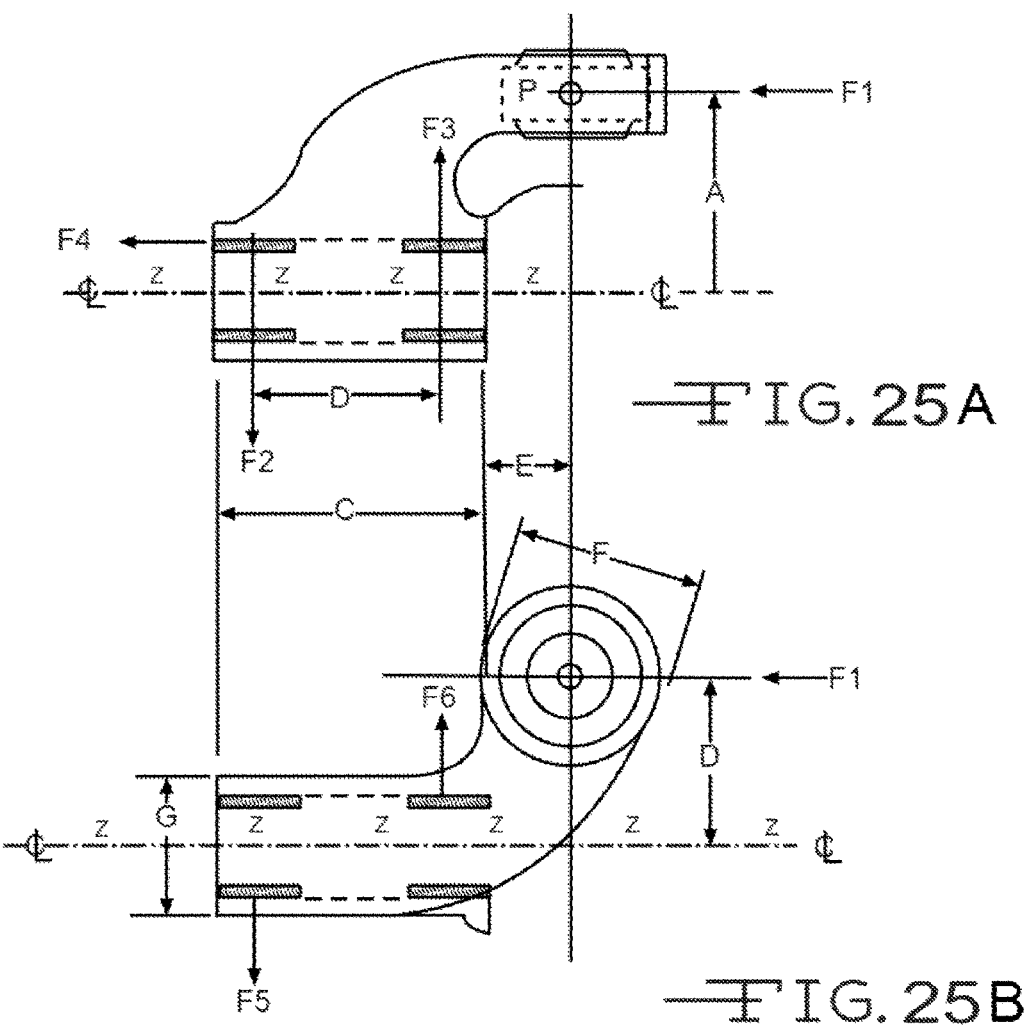

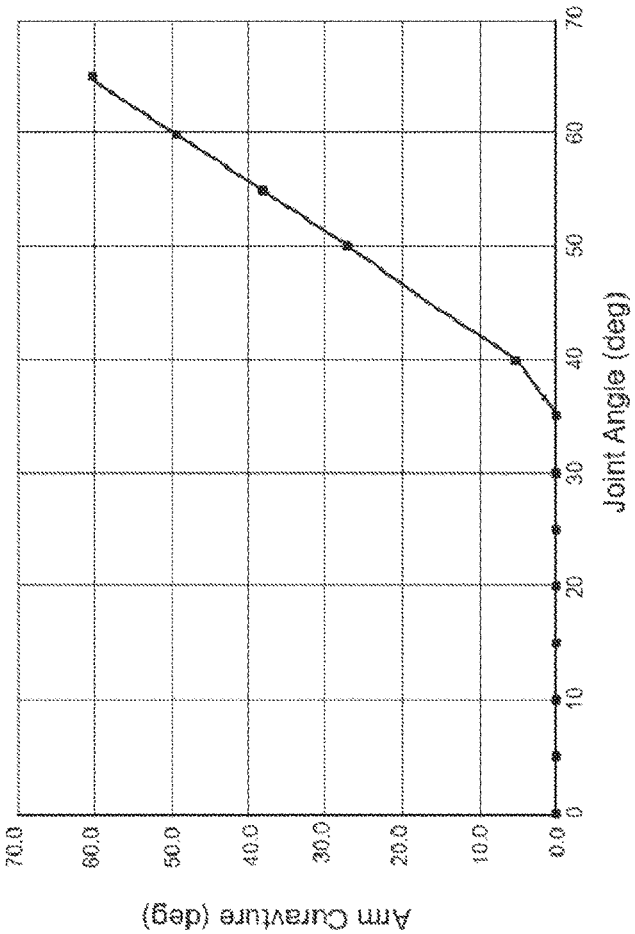

ARTICULATING TORSIONAL COUPLING

CROSS-REFERENCE TO RELATED APPLICATIONS

This application is the U.S. National Phase of International Application PCT/US2015/055011 filed Oct. 9, 2015 which designated the U.S. and that International Application was published in English under PCT Article 21(2) on Apr. 14, 2016 as International Publication Number WO/2016/057967. PCT/US2015/055011 claims priority to U.S. Provisional Application No. 62/061,927, filed Oct. 9, 2014. Thus, the subject nonprovisional application claims priority to U.S. Provisional Application No. 62/061,927, filed Oct. 9, 2014. The disclosures of both applications are incorporated herein by reference in their entirety.

BACKGROUND OF THE INVENTION

This invention relates in general to torque transmitting couplings. In particular, this invention relates to an articulating torsional coupling having a constant velocity output characteristic and an axial plunge capability.

Torque transmitting couplings are typically provided to accommodate power transmission and angular misalignment between two rotating shafts. These couplings often use bearing or bushing elements to permit articulation of input and output components as the shafts rotate. Different coupling designs exhibit particular operating and performance characteristics that limit their application to certain environments. The universal joint, also known as a Cardan or Hooke's Joint, is a two-plane hinge joint having a first plane connected to an output shaft and a second plane connected to an input shaft. A journal cross defines these planes, which are usually oriented at right angles. The journal cross typically terminates in four bearing elements that are mounted to yokes, each yoke lying in one of the first and second planes. A Cardan joint is capable of providing a substantially high power density within a compact rotational envelope, referred to as the "swing diameter." These joints are also durable and, because of the orientation of the bearings and sealing elements, are very damage tolerant, particularly when impinged upon by debris. However when operating at an angle, the Cardan joint produces a non-uniform rotational output characteristic when provided with a uniform input characteristic. This non-uniform rotational characteristic results in the output shaft speeding up and slowing down twice every revolution, resulting in creation of vibration disturbances. The magnitude of this torsional disturbance increases with angle and rotational speed. Because of this condition, operating angles of Cardan joints are often limited to keep torsional disturbances within acceptable limits for a given application.

Other coupling designs are known that address the vibration disturbance issue of a Cardan joint. These couplings utilize various designs to produce a constant or near constant velocity ratio between the input and output shaft speeds relative to the misalignment angle. One broad category of constant velocity joints (CVJs) are the "ball-type" CVJs. These CVJs are the most common variety and rely on concentric input and output bearing races that transmit torque and accommodate angular movement through ball bearing elements. By orienting the ball bearing elements within the homokinetic plane, these joints provide constant velocity motion throughout their articulation range, which may be as high as 45 degrees, or greater. Some of these CVJs have a fixed center while other designs are capable of accommodating axial movement. The most common examples of these ball-type CVJs are the Rzeppa joint, cross-groove joint, and double offset joint. While these joints reduce or eliminate torsional disturbances, they can generate a higher amount of heat due to the ball bearing elements exhibiting both rolling and sliding motion as the joint rotates at an angle. This condition worsens as the torque, speed and angle operating parameters increase. In addition, the most common sealing element for these joints is an elastomeric boot that is often exposed to road debris. Once the boot is torn, these CVJs become quickly contaminated and exhibit a significantly reduced operating life.

Both Cardan joints and ball-type CVJs have limited articulation angles which can restrict the design of the systems to which they are applied. For example, the range of suspension movement in a vehicle, particularly an off-road vehicle, is limited to prevent over-angulation of the half-shafts that connect the axle differential to the wheel ends. Other types of joints that exhibit constant velocity characteristics, such as link-type couplings, have been known for some time. While these joints can be made to articulate at relatively high angles, they suffer from durability issues. These issues are due to the component designs deemed necessary to permit high operating angles without articulated component interference. Thus, prior link-type CVJs have not provided the power density necessary to permit their use in high load and space restricted applications, such as automotive powertrains. Thus, it would be desirable to provide a torque transmitting coupling that provides a constant velocity input to output ratio, accommodates a large articulation angle, and exhibits increased durability with reduced damage exposure.

SUMMARY OF THE INVENTION

This invention relates to torque transmitting couplings and particularly, to an articulating torsional coupling having a constant velocity output characteristic and an axial plunge capability.

A constant velocity coupling has a first central shaft and a plurality of first pivot arms pivotally connected to the first central shaft. The constant velocity coupling further has a second central shaft and a plurality of second pivot arms pivotally connected the second central shaft. An interconnecting bearing element couples each of the first and second pivot arms together such that torque and rotary motion are transmitted through a joint angle. The plurality of first and second arms of the constant velocity coupling define complementary curvatures associated with adjacent arm pivot connections that define a maximum joint angle capacity within a joint swing diameter.

The constant velocity coupling may be configured where the interconnecting bearing element is a spherical bearing element disposed in each of the plurality of first pivot arms. The plurality of second pivot arms may each include a bore to receive an outer race portion of the spherical bearing element. In certain embodiments, the interconnecting bearing element may be a spherical bearing element and one of the first and second pivot arms terminates in a yoke end that engages opposite ends of an inner race portion of the spherical bearing element. In other embodiments, the interconnecting bearing element may be a clevis bearing element.

In certain embodiments, the constant velocity coupling may include a first outer housing having a plurality of lugs connected to the first central shaft. A second outer housing having a plurality of lugs is connected to the second central shaft. The plurality of lugs of the first and second outer housings being in alignment with bores in the first and second central shafts. In other aspects of these embodiments, at least one of the first and second central shafts may be integrally formed with the respective one of the first and second outer housings. Additionally, the plurality of first pivot arms may pivotally connected to the first central shaft through a plurality of column bearing elements each compressed between one of the plurality of lugs and a corresponding face of the first central shaft. Alternatively, the plurality of first pivot arms may be pivotally connected to the first central shaft through a plurality of threaded fasteners secured to the first central shaft. In another aspect of the invention, the plurality of first pivot arms may be pivotally connected to the first central shaft through a journal spider.

In certain other embodiments, the constant velocity coupling may include a centering device that is supported by the first and second central shafts. In one aspect, the centering device is configured to restrict relative extending and compressing axial movement of the first and second central shafts. Such a centering device may be a Cardan joint. Alternatively, the centering package of this aspect may be a first stud terminating in a spherical end supported by the first central shaft and a second stud terminating in a spherical end supported by the second central shaft. The first and second studs may be interconnected by a sleeve. In other embodiments, the centering device may be configured to restrict relative compressing axial movement of the first and second central shafts and permit relative extending axial movement of the first and second central shafts. Still in alternative embodiments, the centering device may be configured to generate an extending force on the first and second central shafts.

In another aspect of the invention, a constant velocity double joint may include first and second constant velocity couplings. A first CV coupling may include a first central shaft and a plurality of first pivot arms pivotally connected to the first central shaft. The first CV coupling may also include a second central shaft and a plurality of second pivot arms pivotally connected the second central shaft. An interconnecting bearing element couples each of the first and second pivot arms together such that torque and rotary motion are transmitted through a joint angle. The first CV coupling may also include a first outer housing having a plurality of lugs is connected to the first central shaft and a second outer housing having a plurality of lugs connected to the second central shaft. The plurality of lugs of the first and second outer housings are aligned with bores in the first and second central shafts The constant velocity double joint also includes a second CV coupling. The second CV coupling has a third central shaft and a plurality of third pivot arms pivotally connected to the third central shaft and a fourth central shaft and a plurality of fourth pivot arms pivotally connected the fourth central shaft. An interconnecting bearing element couples each of the third and fourth pivot arms together such that torque and rotary motion are transmitted through a joint angle. A third outer housing having a plurality of lugs is connected to the third central shaft and a fourth outer housing having a plurality of lugs connected to the fourth central shaft. The plurality of lugs of the third and fourth outer housings are aligned with bores in the third and fourth central shafts. A driven portion of the first CV coupling is connected to a driving portion of the second CV coupling to transmit torque and rotary motion from a driving portion of the first CV coupling to a drive portion of the second CV coupling.

Various aspects of this invention will become apparent to those skilled in the art from the following detailed description of the preferred embodiment, when read in light of the accompanying drawings.

BRIEF DESCRIPTION OF THE DRAWINGS

FIG. 8 is a perspective view of a third embodiment of a CV coupling according to the invention.

FIG. 9 is an exploded view of the CV coupling of FIG. 8.

FIG. 10 is a perspective view of a fourth embodiment of a CV coupling in accordance with the invention.

FIG. 11 is an enlarged, cross sectional view of an embodiment of an interconnecting bearing and link arms of the CV coupling of FIG. 10.

FIG. 22 is a perspective view of another embodiment of an interconnecting bearing and link arms.

FIG. 23 is a cross sectional view of the interconnecting bearing and link arms of FIG. 22, taken along line 23-23.

FIG. 25A is a side view of a load analysis layout of an embodiment of a link arm of a CV coupling in accordance with the invention.

FIG. 25B is a top view of the load analysis layout of FIG. 25A.

FIG. 32A is a table of an embodiment of various design ratios for a CV coupling in accordance with the invention.

FIG. 34 is a table of joint angle capacity versus a pivot arm curvature design angle.

FIG. 35 is a plot of the tabulated values of FIG. 34.

DETAILED DESCRIPTION OF THE PREFERRED EMBODIMENT

Figure 1:
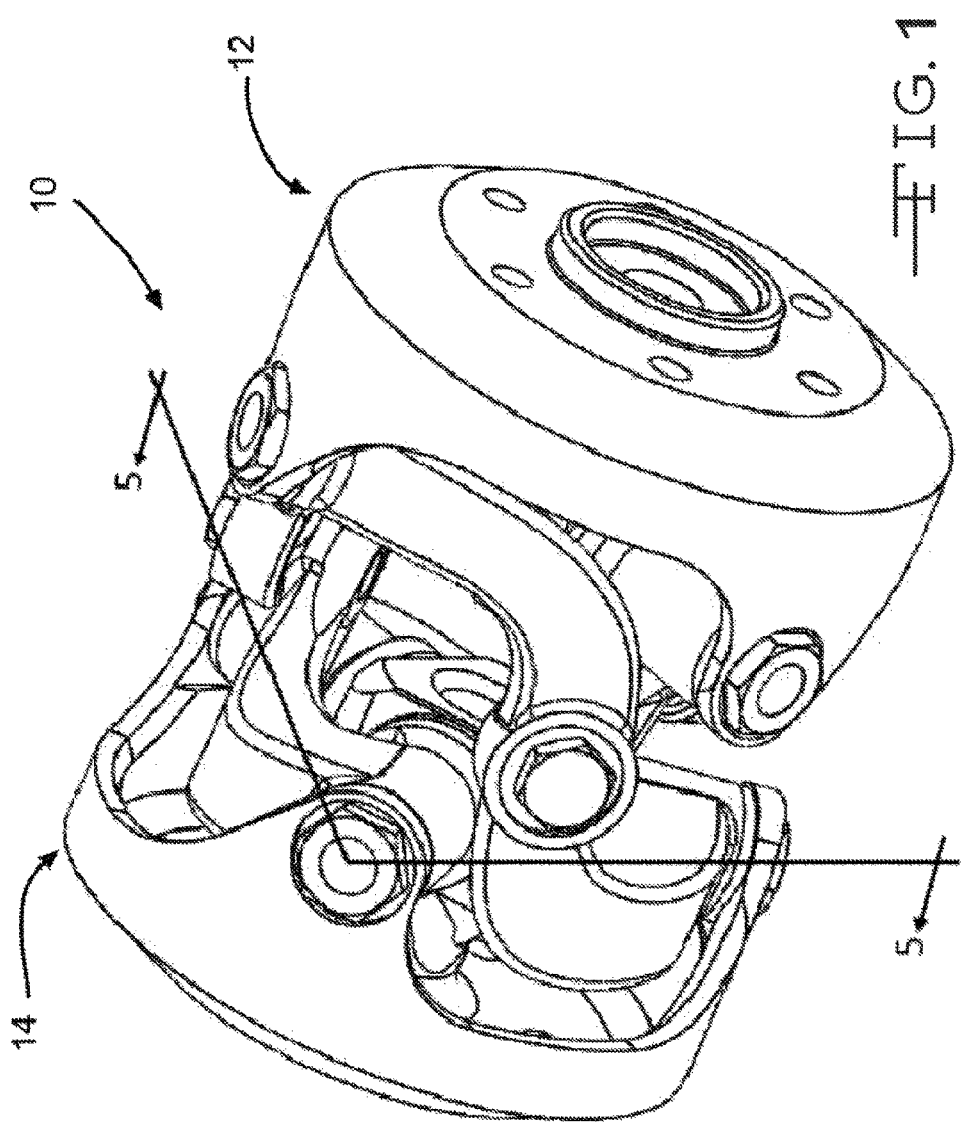
FIG. 1 is a perspective view of a first embodiment of a constant velocity (CV) coupling according to the invention.
Figure 2:
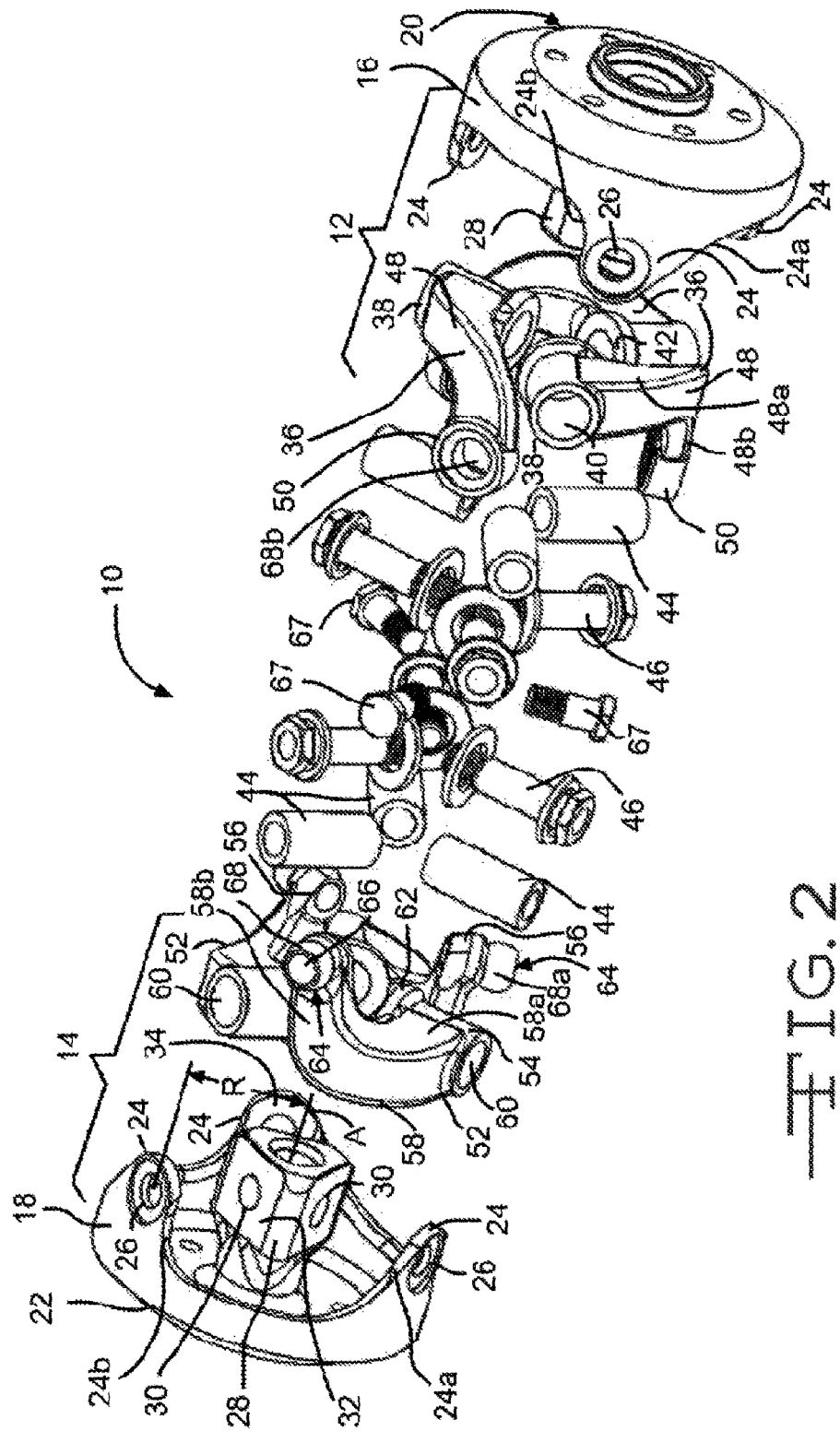
FIG. 2 is an exploded view of the CV coupling of FIG. 1.

Referring now to the drawings, there is illustrated in FIGS. 1 and 2, a first embodiment of a link-type CV coupling, shown generally at 10. The CV coupling 10 includes a driving portion 12 and a driven portion 14. It should be understood that the terms "driving" and "driven" are indicative of the direction of torque input and output. These terms are for description purposes and are not intended to limit the structure or orientation of the CV coupling 10. The driving portion 12 is illustrated having an outer housing 16. The driven portion 14 also includes an outer housing 18 that is similar to outer housing 16, though such is not required. The driving portion 12 and the driven portion 14 may share many common features and elements. These common features and elements will be identified by the same reference numbers. These common elements will be described in the context of either the driving or driven portions, as best shown in the illustrated embodiments. The driving outer housing 16 includes an attachment interface 20, illustrated as a piloted flange. However, the attachment interface 20 may be configured as any type of attachment structure, such as a splined sleeve, splined shaft, or other structure suitable for connecting powertrain components together, which are known in the art. Similarly, the driven outer housing 18 includes an attachment interface 22 that may be configured similarly or differently than the attachment interface 20.

Figure 4:
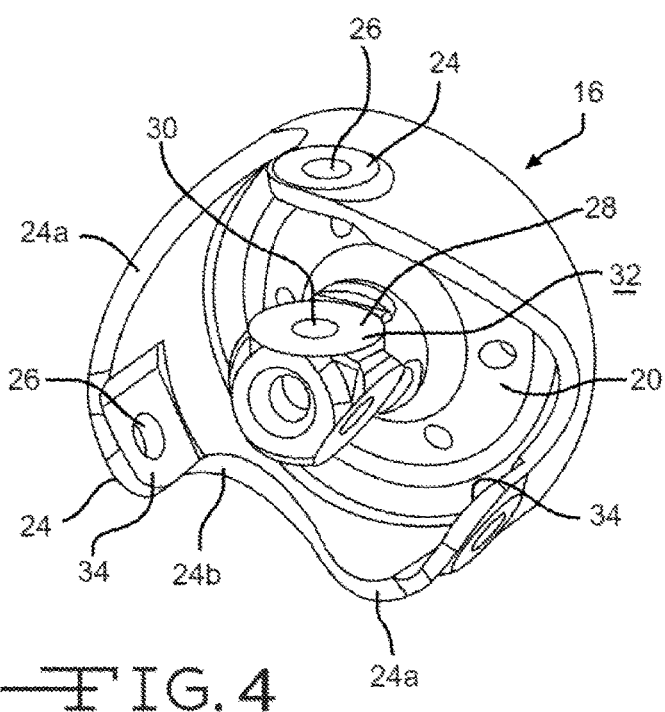
FIG. 4 is a perspective end view of an outer housing and central driving member of the CV coupling of FIG. 1.

As shown in FIGS. 1, 2, and 4, the outer housing 16 includes a plurality of lugs 24 that extend axially from the attachment interface 20. The illustrated embodiment includes three lugs 24, though as few as one and as many as can be positioned around the outer housing 16 may be provided. The lugs 24 are located radially from a central axis A by a radius R which, in part, defines the load capacity of the CV coupling. The lugs 24 are shown equally spaced about the circumference of the outer housing 16 and terminate in bores 26. Alternatively, the lugs 24 may be unequally spaced about the circumference. In the illustrated embodiment, the lugs 24 have differing angled surfaces 24a and 24b in order to permit large operating angles. These angled surfaces, however, may also be configured the same for embodiments that do not accommodate large operating joint angles.

A central shaft 28 extends axially from the outer housing 16. In the illustrated embodiment, the central shaft 28 is integrally formed with the outer housing 16, though such is not required. The central shaft 28 includes bores 30 that are axially aligned with bores 26. The bores 26 and 30 define attachment points for pivot arms, described below. The central shaft 28 further includes a thrust surface 32 that extends around each of the bores 30. The thrust surface 32 provides a torque reaction surface that maintains the orientation and position of the various bearing elements and components of the CV coupling 10. A similar thrust surface 34 is provided on the inner surface of each lug 24 and surrounds the bore 26.

The driving portion 12 includes a plurality of pivot arms 36. As shown in the illustrated embodiment, each of the driving portion pivot arms 36 is configured to be the same. The pivot arm 36 includes a pivot mount 38 having a pivot bore 40 and a thrust face 42. A bearing element 44 may be disposed in the pivot bore 40, which is then coaxially aligned with the bores 26 and 30. The bearing element 44 may be a singular element or a plurality of spaced apart bearing elements. The bearing element 44 may be any suitable type of bearing element, whether providing sliding or rolling contact or a combination of both, such as for example a bushing, needle bearing, ball bearing, barrel-roller bearing and the like. A journal 46 extends through the bearing element 44 and into the bores 26 and 30. In the illustrated embodiment, the journal 46 is configured as a shoulder bolt to provide a pivot axis and to fasten the pivot arm 36 to the outer housing 16 and the central shaft 28. Other journal configurations that rely on additional attachment hardware are also contemplated to be within the scope of the invention. The pivot arm 36 includes a body portion 48 that terminates in a connecting bore 50. The body portion 48 is configured such that the connecting bores 50 are aligned within the homokinetic plane of the CV coupling 10. The body portion 48 includes first and second leg sections 48a and 48b that extend in radial and axial directions. The first and second leg sections 48a, 48b are arranged such that the radial axis of the pivot base 38 connects to the circumferential orientation of the plane of the connecting bore 50 in the homokinetic plane. As will be explained below, the relative angular orientations of these leg sections determine the angular articulation capability and strength capacity of the CV coupling 10.

Figure 5:
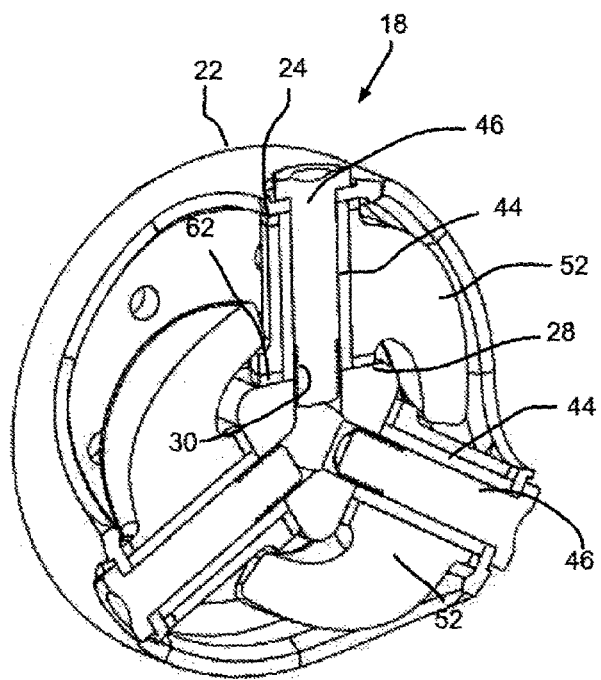
FIG. 5 is a perspective, cross sectional end view of an outer housing and central driving member of the CV coupling of FIG. 2.

In another aspect of the embodiment of FIGS. 2 and 5 the bearing element 44 may be configured as a column member that is compressed between the thrust surface 34 of the lug 24 and the thrust surface 32 of the central shaft 28 by the journal 46 (for example, configured as a bolt). In this configuration, the bearing member may serve as an inner race about which the pivot arm 36 rotates. The compression of the bearing element 44 between the two thrust surfaces increases the rigidity of the attachment point of the pivot arm in reaction to an applied torque.

As shown in FIGS. 2 and 5, the driven portion 14 includes a complimentary set of pivot arms 52 that are similar in arrangement to pivot arms 36. Each of the pivot arms 52 include a pivot mount 54, a connecting end 56, and a body portion 58. The pivot mount 54, as illustrated, may be configured to be the same as the pivot 38 including a pivot bore 60 and a thrust face 62. The bearing element 44 may be disposed in the pivot bore 40, which is then coaxially aligned with the bores 26 and 30 and operatively connected by journals 46. The connecting end 56 of the driven portion pivot arm 52, in the illustrated embodiment, supports a spherical bearing assembly, indicated generally at 64. The spherical bearing assembly 64 includes an inner attachment portion 66 that defines an inner race, or rotational support surface, and a mounting structure that attaches the spherical bearing assembly to the connecting end 54. The inner attachment point 66 may be configured as a bore that accepts a fastener 67, such as a bolt, to pivotally retain the spherical bearing assembly, the pivot arm 36 and the pivot arm 52 together. In the illustrated embodiment, the inner attachment point defines an axis having a generally radial orientation relative to the axis A. The spherical bearing assembly 64 further includes an inner race 68a having a curved or spherical outer surface. The inner race 68 is configured to be received within an outer race 68b, received within the bore 50 of the driving pivot arm 36 to connect the driving and the driven pivot arms 36 and 52 together. The outer race 68b may have a mating spherical inner surface. The pivot arm 36 pivots about the spherical bearing inner and outer races 68a and 68b relative to pivot arm 52 as the CV coupling revolves through 360 degrees at a joint angle between interconnecting shaft axes.

Figure 3:
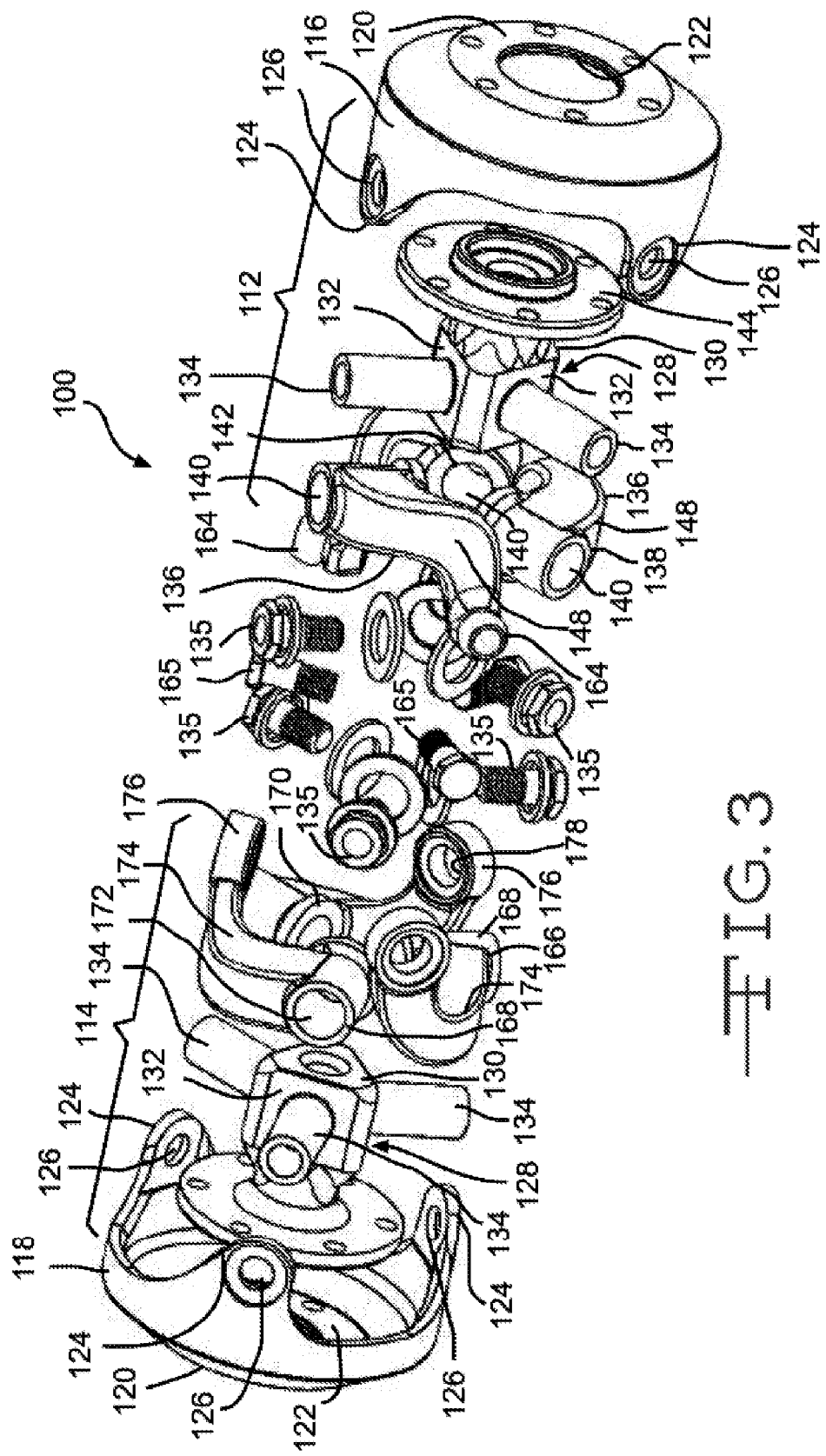
FIG. 3 is an exploded, perspective view of a second embodiment of a CV coupling according to the invention.

Referring now to FIG. 3, another embodiment of a CV coupling, shown generally at 100 is illustrated. The CV coupling 100 includes two ends, similar to the CV coupling 10 above, which will be described in the context of a driving portion 112 and a driven portion 114. The driving portion 112 and the driven portion 114 are illustrated having outer housings 116 and 118, respectively. The outer housings 116 and 118 are similar in configuration, though such is not required. The outer housing 116 includes an attachment interface 120 that may be any structure configured to permit attachment of the outer housing to a mating driveline component, such as a companion flange, splined member (fixed or sliding), and the like. The outer housing 116 further includes a spider mounting surface 122 that locates and supports the attachment of a journal spider, shown generally at 128. The outer housing 116 further includes a plurality of lugs 124, which are shown in the illustrated embodiment as being three lugs 124, equally spaced about the circumference, though such is not required. Each lug 124 includes a mounting bore 126.

The journal spider 128 includes a central body 130 having a plurality of thrust surfaces 132 and a pivot journal 134 that extends radially from each thrust surface 132. The pivot journals 134 are configured to be aligned with the mounting bores 126. In one embodiment, the pivot journals 134 may be configured to accept a fastener 135, such as for example a bolt or snap ring arrangement (i.e., removable) or rivet, weld, staked attachment and the like (i.e., permanent attachment) to retain the pivot journal 134 to the lug 124. The specific illustrated embodiment shows three, integrally-formed thrust surface and pivot journal structures (132 and 134) disposed equidistantly; however, the number and spacing may be varied. The thrust surface 132 may function in the generally same manner as thrust surface 32, described above. In one embodiment, the pivot journals 134 may be formed as an inner race surface that extends through a bore 140 formed through a pivot mount 138 of a pivot arm 136. In one embodiment, the pivot mount 138 may function as an outer bearing race and may further include one or more rows of rolling element bearings, such as conventional needle rollers may be disposed along the surface of the pivot journal 134. The pivot mount 138 may further include a thrust surface 142 that engages the thrust surface 132. The pivot arm 136 further includes a body portion 148 that is illustrated as being angled in at least two planes, similar to body portion 48 described above. The body portion 148 terminates in a spherical bearing assembly 164, similar to spherical bearing assembly 64, described above. In the illustrated embodiment, a spider mount 144, shown as a flange, extends between the central body 130 and the spider mounting surface 122. The spider mount 144 is configured to locate and center the journal spider relative to the outer housing 116. Any suitable mounting arrangement, such as a splined shaft that mates with a splined bore through the body 130, mating tapers, and the like may be provided.

Figure 6:
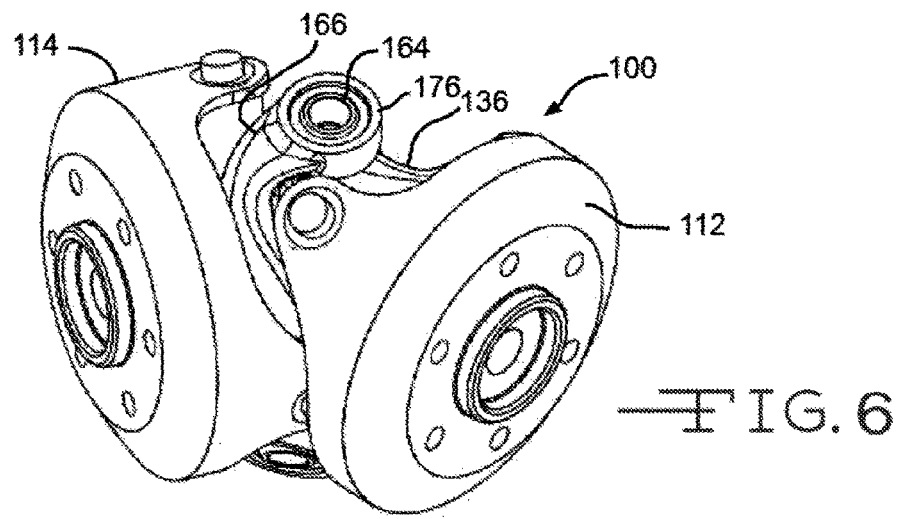
FIG. 6 is a perspective view of a closed side of the CV coupling of FIG. 3 in an angulated position.
Figure 7:
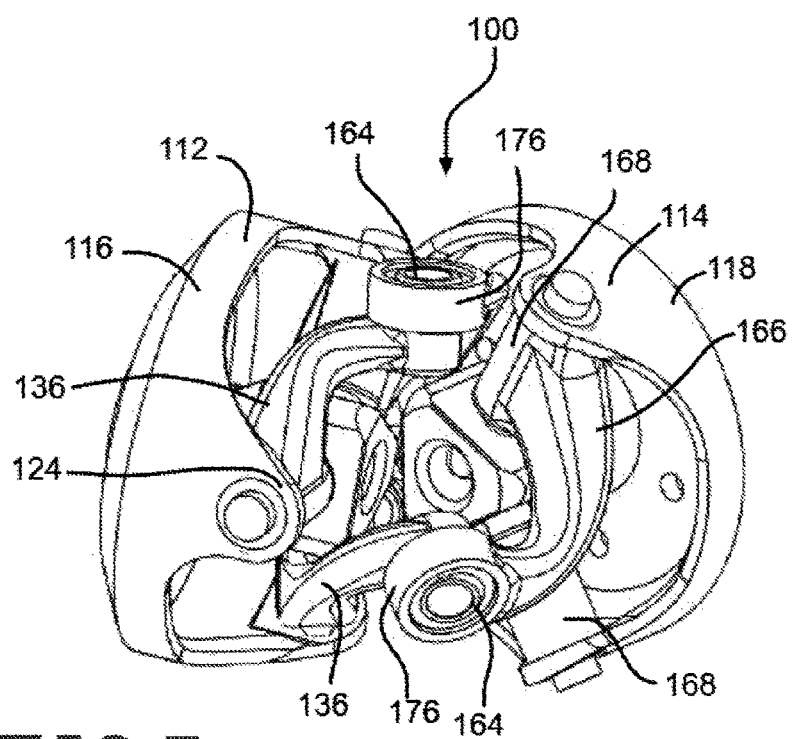
FIG. 7 is a perspective view of an opened side of the angulated CV coupling of FIG. 3.

The driven portion 114 is illustrated having an outer housing 118 and a journal spider 128 that are the same or similar to those of the driving portion 116, though such is not required. The driving portion 114 further includes driven pivot arms 166 that include a pivot mount 168 having a thrust surface 170 and a pivot bore 172. The pivot arms 166 also include a body portion 174, similarly configured to the body portion 148 of the driving portion 112, that terminates in a connecting end 176 having a bore 178 formed therethrough. The connecting bore 178 is configured to receive an outer race portion of the spherical bearing assembly 164 such that torque, rotational and angular motion from the driving portion 112 are transmitted to the driven portion 114. A fastener 165, illustrated as a bolt, may be provided to retain the assembled connection of the spherical bearing assembly and the pivot arms 136 and 166 together. Referring now to FIGS. 6 and 7, the embodiment of the CV coupling 100, described above, is shown in an assembled and articulated condition.

Referring now to FIGS. 8 and 9, there is illustrated another embodiment of a CV coupling, shown generally at 200. In the illustrated embodiment, the CV coupling 200 includes a driving portion 212 and a driven portion 214. The driving and driven portions 212 and 214 include outer housings 216 and 218 that are generally the same as outer housings 16 and 18, described above. Connected to the driving portion outer housing 216 are a plurality of pivot arms 236. Similar to the pivot arms described above, pivot arm 236 includes a pivot mount 238 having a pivot bore 240 formed therethrough and a thrust surface 242. A body portion 248 extends in a plurality of relatively angled planes from the pivot mount 238. The body portion 248 of each pivot arm 236 terminates in a clevis receiver 250. The clevis receiver 250 includes a clevis pivot bore 252 that mates with a clevis 254. The clevis 254 includes a stem end 256 and a yoke end 258. The stem end 256 is supported for rotational and axial movement relative to the pivot arm 236 about an axis (not shown) extending through the clevis pivot bore 252. Rolling or sliding bearing elements (not shown) may be provided between the stem end 256 and the clevis pivot bore 252 if desired.

The driven portion 214 includes a plurality of pivot arms 260, that are illustrated as the same or similar to pivot arms 236, though such is not required. The pivot arm 260 includes a pivot mount 262 having a pivot bore 264 extending therethrough and a thrust surface 266. A body portion 268 extends is a plurality of angled planes from the pivot mount 262 and terminates in a link receiver 270 having a link pivot bore 272 extending therethrough. A hinge link 274 includes an eyelet end 276 and a pivot stem 278. The eyelet end 276 includes thrust surfaces 280 which are received within the yoke end 258. The eyelet end 276 is pivotally retained therein by a fastener, such as a pin, rivet, bolt and the like (not shown). The hinge link pivot stem 278 may be supported within the link pivot bore 272 in a similar manner to the clevis stem end 256, described above. As the CV coupling 200 rotates through a 360 degree revolution and through a joint articulation angle, the clevis 254 and hinge link 274 rotate relative to their respective pivot bores and the eyelet end 276 hinges within the clevis yoke 258. The thrust surfaces 280 engage the inner surface of the clevis yoke 258 to transmit motion from the driving portion 212 to the driven portion 214.

Referring now to FIGS. 10 and 11, there is illustrated another embodiment of a CV coupling, shown generally at 300. Similar to the CV coupling embodiments described above, the CV coupling 300 includes a driving end 312 and a driven end 314. The driving and driven ends 312 and 314 include outer housings 316 and 318 the may be configured in a similar manner to the various outer housing embodiments described herein. The driving end 312 includes a plurality of pivot arms 320. The pivot arms 320 include a pivot mount 322, configured similarly to the various pivot mount embodiments described above. A body portion 324 extends from the pivot mount 322 at a plurality of relatively angled planes and terminates in a swivel hinge end 326. The swivel hinge end 326 includes a swivel receiving bore 328 that accepts a spherical swivel bearing assembly 340. In one embodiment, the swivel bearing assembly 340 includes a spherical inner race 342 and a mating outer race 344 that curves around the outer diameter of the inner race 342. The spherical inner race 342 includes a bore 346 formed therethrough. The bore 346 may include rolling or sliding bearing elements that also engage a clevis pin 348a. The swivel hinge end 326 is configured to be received within a clevis end 350 of a driven pivot arm 352. The driven pivot arm 352 may be configured similarly to driving pivot arm 324. The clevis end 350 includes a yoke 354 having bores 356 that engage the spherical inner race 342 and accept the clevis pin 348a. A crush sleeve 348b may be provided to maintain a spaced apart relationship of the ears of yoke 354 and may serve as a race for the rolling or sliding bearing elements within the spherical inner race 342. The crush sleeve 348b may also serve as a structural member to increase rigidity of the joint. As the CV coupling 300 rotates through 360 degrees at an articulated joint angle, the spherical inner race 342 pivots within the outer race 344. In one embodiment, the spherical inner race 342 may also rotate within the outer race 344 about an axis that is in line with the clevis pin 348a. In another embodiment, the spherical inner race 342 may rotate about the clevis pin 348a and relative to the yoke 354. The clevis pin 348a may be any suitable fastening structure that retains the driving and driven pivot arms 320 and 352 and permits rotation of the swivel bearing assembly 340. In one embodiment, the clevis pin 348a may be a threaded fastener, such as a bolt and nut, or alternatively a rivet that permits a clamping force to be applied to the crush sleeve 348b.

Figure 12:
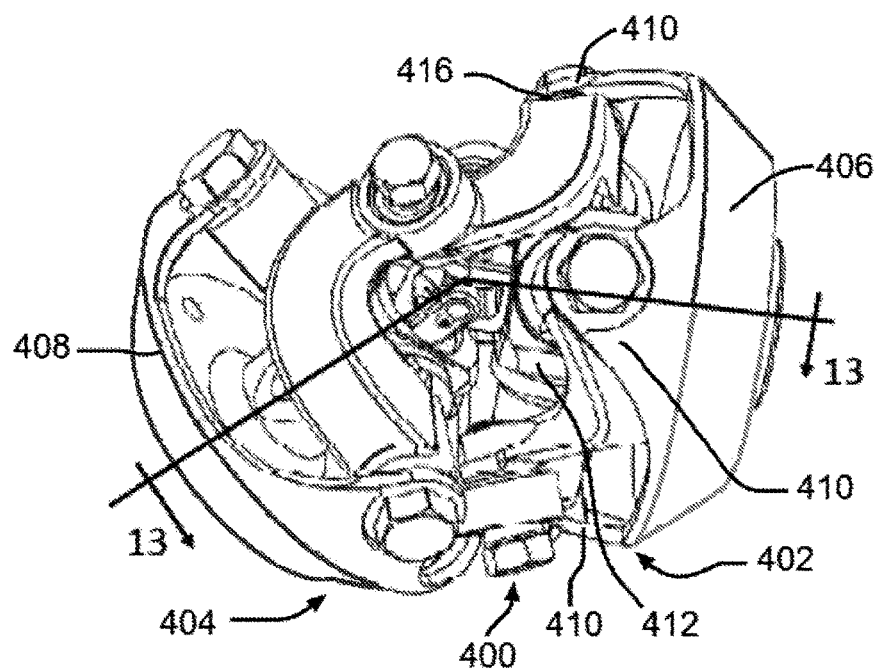
FIG. 12 is a perspective view of a fifth embodiment of a CV coupling in accordance with the invention.
Figure 13:
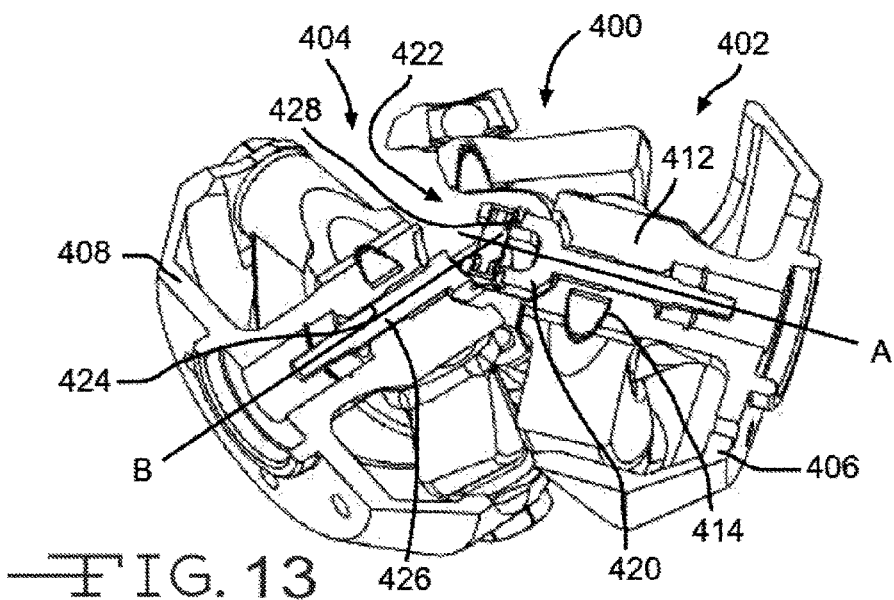
FIG. 13 is a perspective view of the CV coupling of FIG. 12, shown in cross section taken along line 13-13.

Referring now to FIGS. 12 and 13, there is illustrated an embodiment of a CV coupling, shown generally at 400. The CV coupling 400 includes a driving portion 402 and a driven portion 404, illustrated in a similar configuration to the CV coupling 300, above. The driving and driven portions 402 and 404 include outer housings 406 and 408, respectively. The outer housings 406 and 408 are illustrated having a similar configuration, and will be described in the context of outer housing 406. The outer housing 406 includes a plurality of lugs 410 and a central shaft 412. The central shaft 412 includes a plurality of bores 414 that are aligned with bores 416 formed in the lugs 410, similar to the embodiments described above. The central shaft 412 further includes a centering bore 418 formed along axis A. The centering bore 418 is configured to support a first portion 420 of a centering device 422, illustrated as a Cardan joint yokeshaft. The outer housing 408 of driven portion 404 is configured as a mirror image of the driving portion outer housing 406, including the central shaft 412 having a centering bore 424, defining a second axis B, and a second portion 426 of the centering device 422. The first and second centering portions 420 and 426, when configured as Cardan yokeshafts, are connected together by a universal joint 428. One or both of the Cardan yokeshafts 420 and 426 may be rotatably mounted and axially constrained to the respective central shaft centering bores 418 and 424. The centering device 422 maintains the spatial intersection of axes A and B as the joint articulates through a changing joint angle. In the illustrated embodiment, the centering device 422 is configured to prevent relative axial movement of the driving portion 402 relative to the driven portion 404, as the CV coupling 400 articulates through the operating angle. In certain cases, the centering device components may not need be rotatably mounted. Additionally, for typical joint construction configurations, a Cardan joint would be substantially modified and can be taken to high misalignment angles, such as about 90 degrees, and still have the necessary thrust capabilities. All other types of CV centering devices will likely substantially decrease/limit joint angle capability.

In one embodiment, the Cardan yokeshafts 420 and 426 may be supported by bearings within at least one of the central shaft centering bores 418 and 424. The rotational support of one or both of the yokeshafts 420, 426 permits the centering device 422 to rotate independently of the central shafts. As the driving and driven portions 402 and 404 articulate the operating angle may exceed the angle capacity of the centering device 422. This over angulation of the centering device 422 may cause the device to stop moving relative to the support. Thus, the bearing supports in the bores 418, 422 permit the driving and driven portions to continue operation without interference from the centering device. In addition, the support bearing may further permit the non-uniform rotational characteristics of a Cardan centering device from interacting with the central shafts. Alternatively, the centering device need not be a Cardan joint but may be any fixed coupling element, such as a fixed center cross groove CV joint, a fixed center double offset CV joint, or any other fixed center, angle accommodating device.

Figure 14:
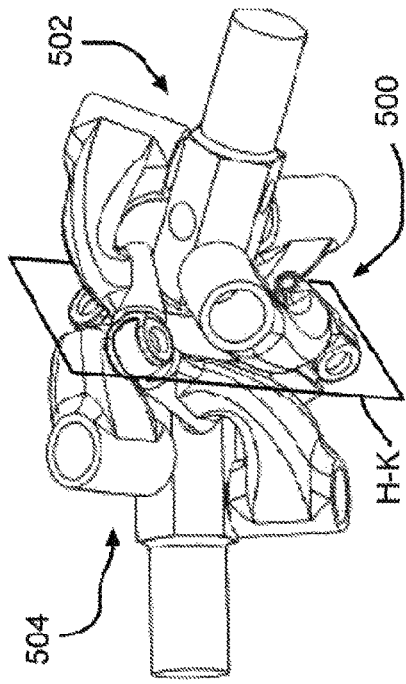
FIG. 14 is a perspective view of a sixth embodiment of a CV coupling in accordance with the invention.
Figure 15:
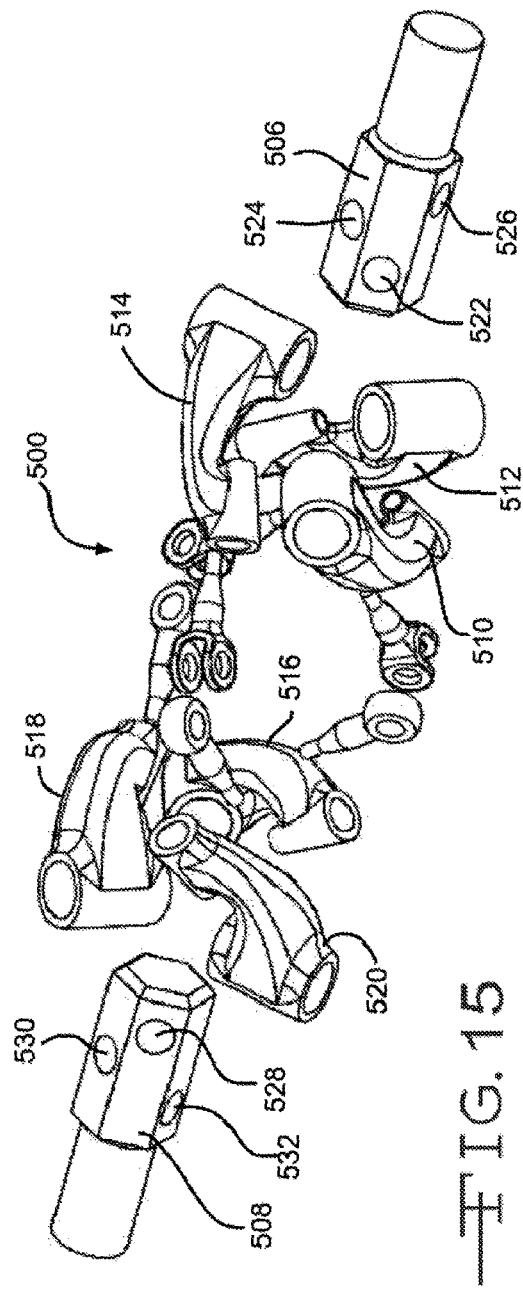
FIG. 15 is an exploded, perspective view of the CV coupling of FIG. 14.

Referring now to FIGS. 14 and 15, there is illustrated an embodiment of a CV coupling, shown generally at 500. The CV coupling 500 does not include outer housings but may be used in conjunction with features of the various embodiments of the CV coupling, described above, including the outer housings. The CV Coupling will be described in conjunction with a driving end 502 and a driven end 504. The driving end 502 of the CV coupling 500 further includes a central shaft 506 and a plurality of pivot arms 510, 512, and 514. The driven end 504 includes a central shaft 508 and a plurality of pivot arms 516, 518, and 520. The pivot arms 510-520 include interconnecting bearing elements, illustrated as clevis and hinge link elements similar to the clevis and hinge link elements 254 and 274, described above. It should be understood that any of the various pivot arm interconnecting structures may be applicable to this embodiment. The center of the interconnecting elements lie in the homokinetic (HK) plane. The central shaft 506 includes a plurality of bores configured to pivotally support the pivot arms 510, 512, and 514. The bores 522, 524 and 526 are longitudinally offset along the centerline of the central shaft 506. The pivot arms 510, 512, and 514 vary in length from the homokinetic plane to the respective pivot bores 522, 524, and 526 by the amount of the offset of the bores. Thus, pivot arm 510 locates in pivot bore 522 and has the shortest length. Pivot arm 514 locates in pivot bore 526 and has the longest length. Pivot arm 512 locates in pivot bore 524 and has a length about midway between the pivot arms 510 and 514. These length variations permit the centerlines of the interconnecting bearing elements to lie substantially within the homokinetic plane, thus permitting constant velocity speed operation through the angular articulation range. Similarly, central shaft 508 includes offset pivot bores 528, 530, and 532. Pivot arms 516, 518, and 520 are configured with length variations that correspond to the pivot bore offset distances. As illustrated, pivot arm 516 is the shortest arm and is supported by pivot bore 528. Pivot arm 518 has an intermediate length and is supported by pivot bore 530. Pivot arm 520 is the longest of the three and is supported by pivot bore 532. In the illustrated embodiment, the three lengths of the pivot arms are the same between the driving and the driven portions 502 and 504. Thus, for example, pivot arm 514 is the same length as pivot arm 520.

Figure 16:
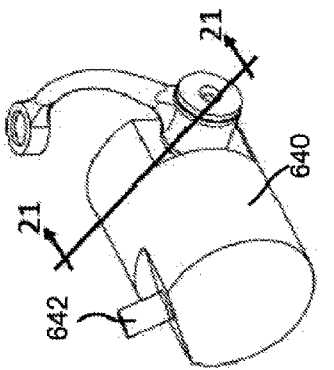
FIG. 16 is a perspective view of an alternative embodiment of a central driving member and link arm subassembly.
Figure 18:
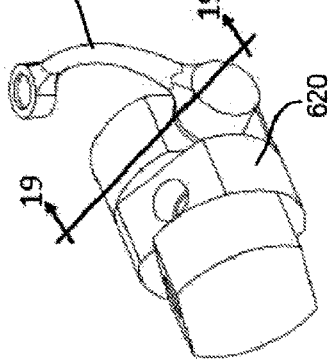
FIG. 18 is a perspective view of yet another embodiment of a central driving member and link arm subassembly.
Figure 20:
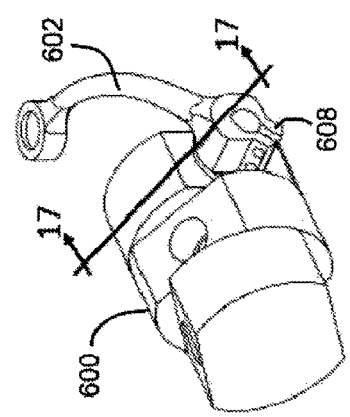
FIG. 20 is a perspective view of still yet another embodiment of a central driving member and link arm subassembly.
Figure 17:
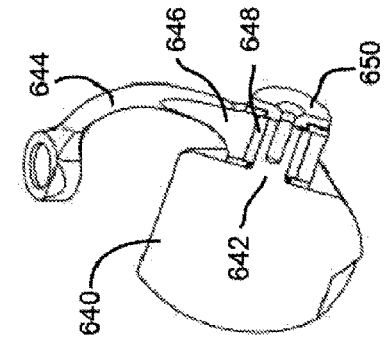
FIG. 17 is a cross sectional view of the central driving member and link arm subassembly of FIG. 16 taken along line 17-17.
Figure 19:
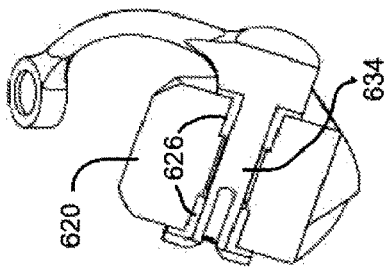
FIG. 19 is a cross sectional view of the central driving member and link arm subassembly of FIG. 18 taken along line 19-19.
Figure 21:
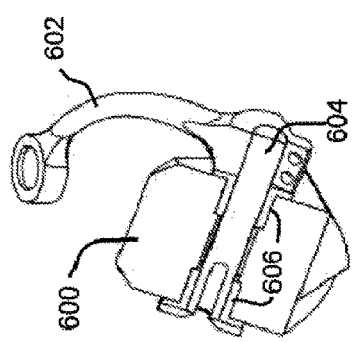
FIG. 21 is a cross sectional view of the central driving member and link arm subassembly of FIG. 20 taken along line 21-21.

Referring now to FIGS. 16-21, there are illustrated various embodiments of a central shaft having different pivot arm mounting arrangements. Though illustrated in conjunction with embodiment of the central shaft 506 having offset pivot bores, these embodiments may be used in conjunction with other configurations of the central shaft, described herein. FIGS. 16 and 17 illustrate an embodiment of a central shaft 600 having a pivot arm 602 mounted onto a through shaft 604 that is supported by two bearing elements 606. The pivot arm is connected by way of a pinch connection 608. FIGS. 18 and 19 illustrate an embodiment of a central shaft 620 and a pivot arm 622. The pivot arm 622 includes an integrally formed pivot shaft 624 that is supported on the central shaft 620 by bearings 626. FIGS. 20 and 21 illustrate another embodiment of a central shaft 640 having a plurality of pivot support trunnions 642 extending therefrom. Each of the trunnions 642 pivotally supports a pivot arm, such as pivot arm 644. The pivot arm 644 includes a bearing end 646. The bearing end 646 may be a bore that receives a bearing or bushing assembly, such as needle roller assembly 648, which is disposed about the trunnion 642. The pivot arm 644 and needle rollers 648 are retained by an end cap 650.

Referring now to FIGS. 22 and 23, there is illustrated an embodiment of a pair of pivot arms 702 and 704 coupled by an interconnecting spherical bearing 706. This embodiment is similar to the CV couplings 10 and 100, described above. The interconnecting spherical bearing 706 includes a ball stub portion, shown generally at 708. The ball stud portion 708 includes a ball end 710 and a stud end 712. The stud end 712 may be tapered to engage a mounting bore 714 and be retained by a retaining nut 716. The ball end 710 is retained in a spherical outer race 718 and may be configured as a relubricatable bearing element having a zerk fitting 720.

Figure 24:
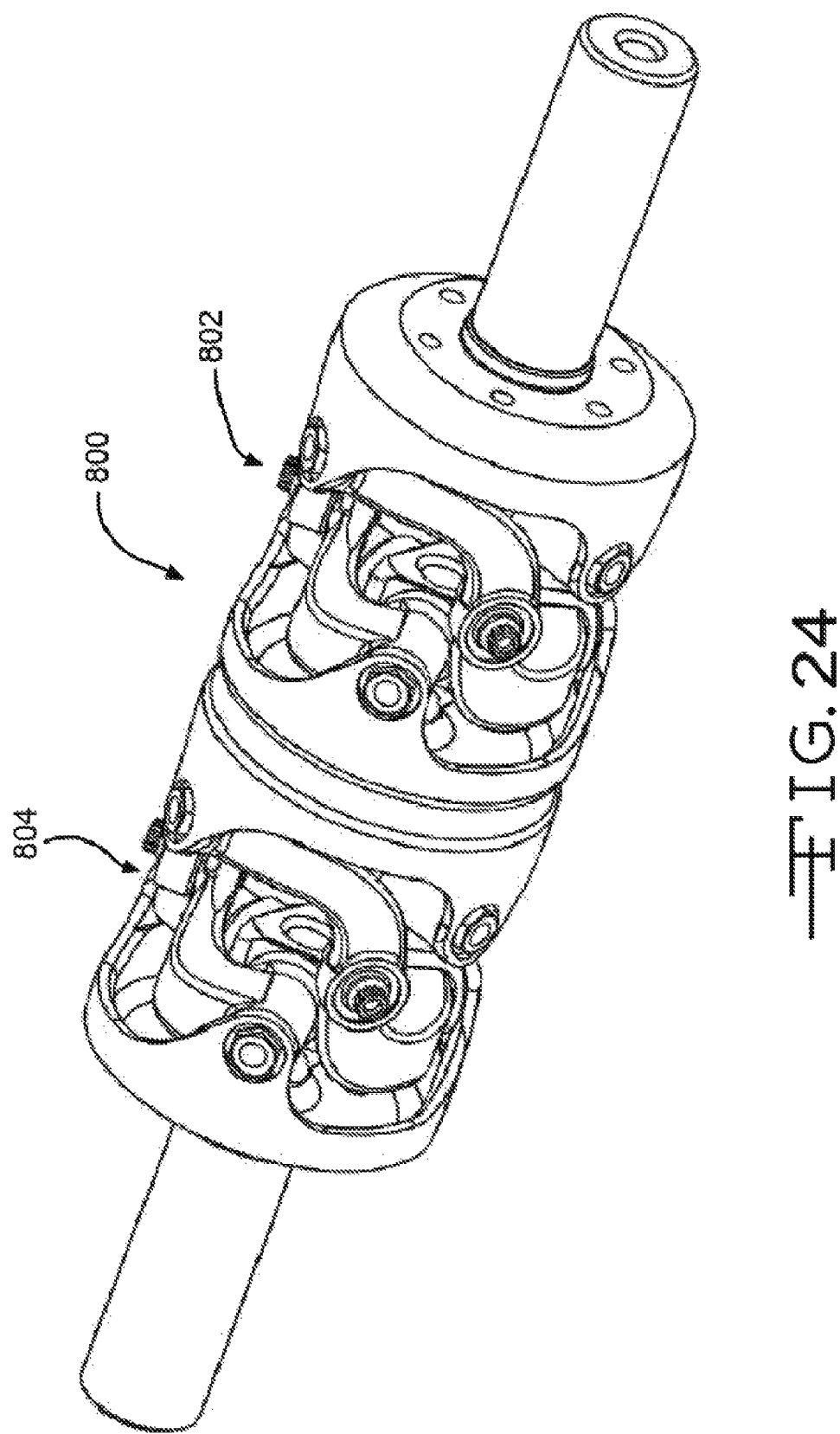
FIG. 24 is a perspective view of an embodiment of a double joint CV coupling assembly in accordance with the invention.

Referring now to FIG. 24, there is illustrated an embodiment of a double joint, shown generally at 800. The double joint 800 includes a first CV coupling 802 connected to a second CV coupling 804. Any of the embodiments of CV couplings described herein may be provided as the first and second couplings 802 and 804. In one aspect, the double joint may be a self-supporting joint where each of the CV couplings includes a centering device, such as that shown in FIGS. 12, 13, and 27 for example. In another aspect, the double joint may omit the centering devices form one or both of the couplings. In this case the joint can be used to connect to rotating shafts with non-intersecting axes. As illustrated, coupling 802 is attached to coupling 804 by connecting the two end outer housings. Alternatively, the two end outer housings may be formed as a single structure.

Figure 39:
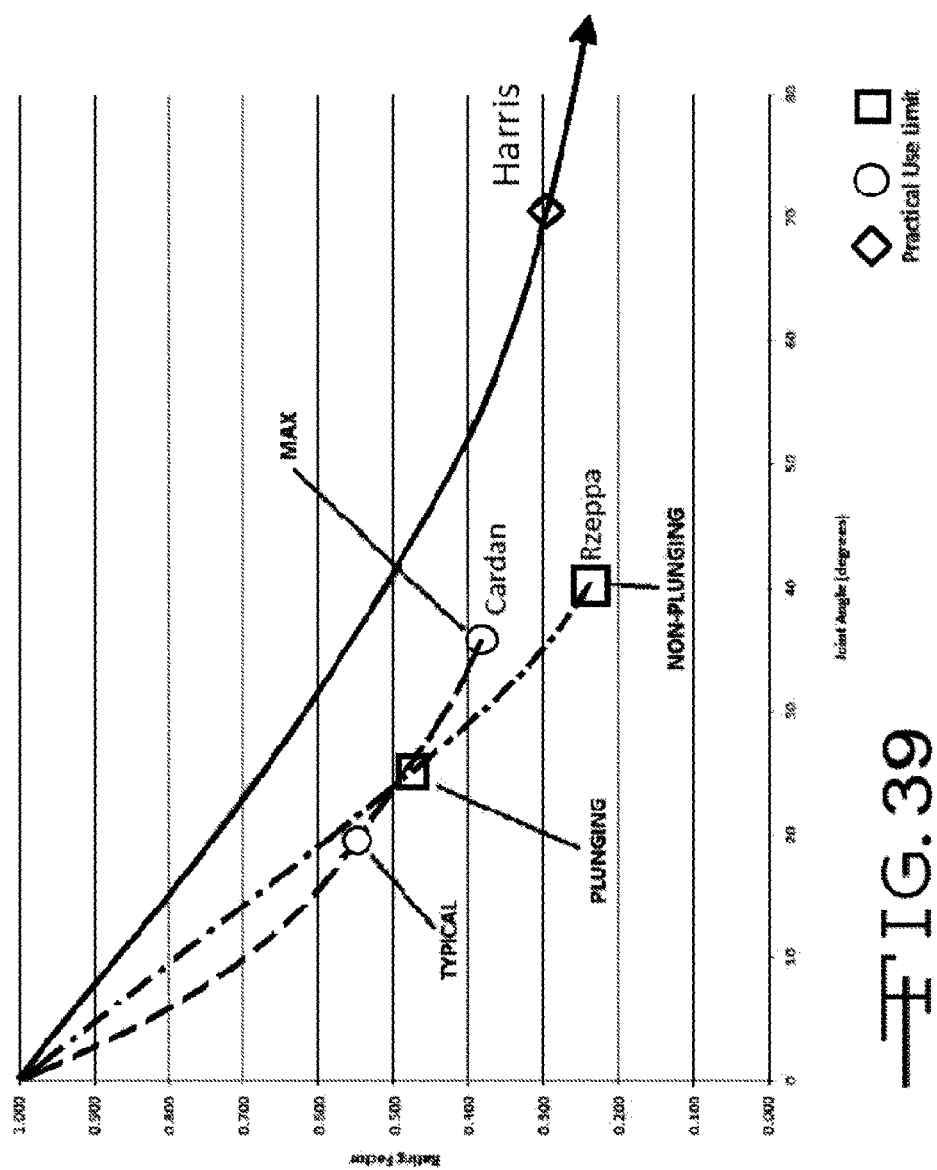
FIG. 39 is a graph comparing torque versus joint operating angle of various types of torsional couplings.

Referring to FIG. 39, there is illustrated a comparative graph of torque versus operating angle for various types of torque transmitting couplings, and various embodiments of the CV coupling (also termed the "Harris" joint) according to the invention. The maximum operating angle limits for each kinematic coupling may be based on a variety of factors, such as bearing life, rotational speed, and component strength, to name a few. It should be noted that the Rzeppa curve represents a composite of several different types of commonly used CV couplings, such as the Rzeppa Joint, Cross Groove joint, and Double Offset Joint. It may be observed that the Harris joint has a much higher practical angular use limit, along with a less drastic torque degradation as a function of joint angle. Both of these factors will help lift constraints typically used in powertrain design to provide better performing and more efficient systems.

The various embodiments of the "Harris" coupling according to the invention described above, consist of three primary component types that form each half of the coupling:

1. Articulating arms (one or more pairs), three pairs allow for a self centering, very high torque capacity high angle compact coupling.
2. The central input and output shafts from which the arm pivot shafts extend radially to attach to the outer housing.
3. The outer arm pivot bearing shaft housing support member.

The outer housing can be an integral part of the central member or an individual bolt on member. The ability of the Harris coupling to have individual bearing seals without a boot requirement is especially useful for very high angle applications where boots are prone to fail. In certain embodiments, however, the Harris coupling may include a boot in lieu of individual bearing seals or in addition to these bearing seal for added contamination resistance. The rigidity of the individual components keeps the arm spherical bearing centers lying substantially within the homokinetic plane under operating conditions. Significant deviation of these centers from the homokinetic plane may cause velocity fluctuations that can result in drive pulsations.

The Arm Assemblies

While not exhaustive, some select primary design considerations for the arm assemblies include the following:
1. Beam strength
2. Torsional strength
3. Pivot bearing spacing and size
4. Spherical bearing size A numerical analysis of these design considerations is based on a force analysis for a specific implementation of an embodiment of the Harris coupling based on a 4.75 inch outer diameter coupling loaded to 2000 foot pounds of torque. Referring to FIGS. 25A and 25B, there are illustrated a side view and a top view, respectively, of a typical arm having a pivot axis—Z—and a spherical bearing (or Clevis) having a center, P. In a particular aspect of the invention, an example of actual dimensions are described below. As shown in the top view of FIG. 25B, the arm includes a bend that offsets the bearing center, P from the pivot axis Z. This bend permits the operating angle of the joint to be maximized while minimizing the overall axial length of the assembly. Similarly, when maximizing the operating angle to approach an outer envelope of about more than 80°, other portions of the arm between the interconnecting bearing support and the arm base pivot connection may include contours. Such contouring is provided to smooth load flow (i.e., stress distributions and strain concentrations) through the arm and avoid component collisions.

As shown in FIGS. 25A and 25B, some exemplary arm dimensions, as used in the load calculations include the following:
A=1.5 inches coupling rotation ℄ to P (side view)
B=1.0 inch pivot bearing center distance (½" wide bearings)
C=1.5 inches total length of arm pivot bearing hole
D=1.25 inch arm bend offset from coupling rotation ℄ to P (top view)
E=0.60 inch
F=1.20 inch bearing support housing OD
G=1.20 inch arm section thickness
T1, T2 are illustrated as thrust bearing faces Local arm loads, in pounds, and the approximate force directions, which vary with coupling angle, are calculated from the dimensions of FIGS. 25A and 25B as follows:
F1=5333 lbs.; F2=8000 lbs.; F3=8000 lbs.;
F4=5333 lbs.; F5=6666 lbs.; F6=6666 lbs. As shown in FIGS. 25A and 25B, the arms experience both a high bending (beam) load and a torsional load due to the offset of the spherical ℄ (dim. D) from the pivot axis Z.

In one embodiment, the ratio of A/B may be in the range of (approx.) 1:1 to 1.5:1. In another embodiment, the ratio may be dependent on maximizing the "B" dimension.

Central Driving Member

The central driving member, also described above as the central shaft 28 and the related various embodiments, provides a mounting connection for torque transmission between the input or output shafts and the respective driving or driven link arms. In one embodiment, the central driving member is a separate component from the outer housing. In another embodiment, the central driving member may be the only support connection between the link arms and the input or output shafts.

As shown in FIG. 25A, driving loads are transmitted from one half of the coupling to the other half via the pivotal arm connection "P." The three articulation points shown in conjunction with the pivot arm connections, P equate to six "arms" or arm segments. The arm force diagram shows that the load at "P" produces an internal torque between central member and the housing, also termed outer housing 16, 18 and the various embodiments thereof. The arm reaction forces are accounted for by maximizing the torsional stiffness of both the central member and the outer housing. Increasing the torsional stiffness reduces deflections and added bearing loads from skewing or pinching of bearing elements that can reduce bearing life.

Figure 26A:
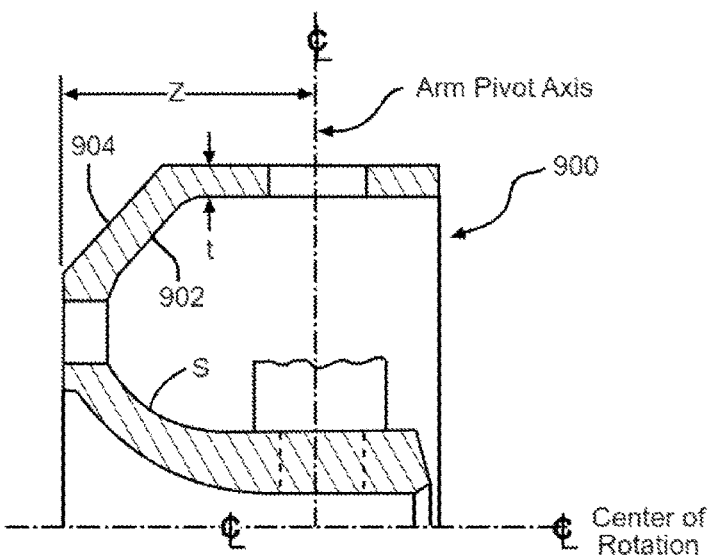
FIG. 26A is an outer housing cross section analysis showing a material optimization embodiment.
Figure 26B:
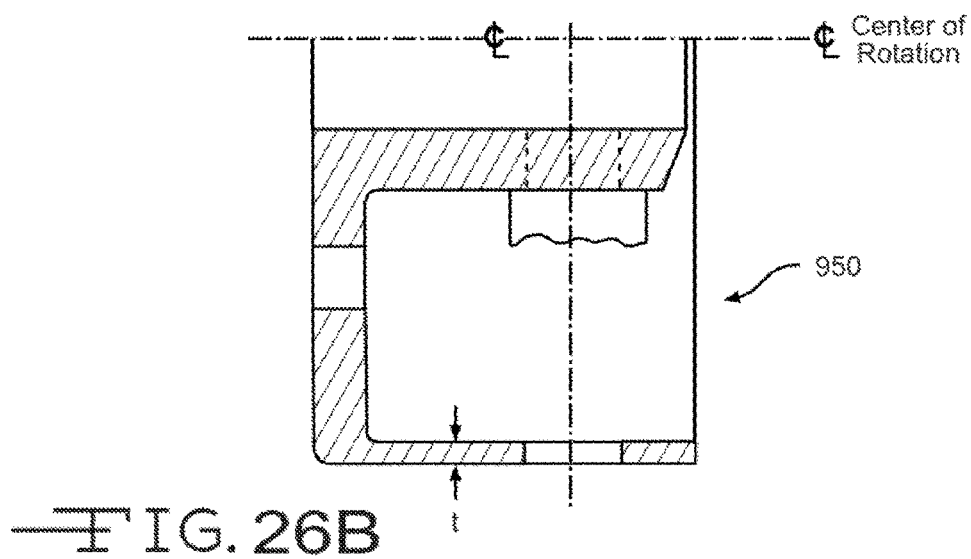
FIG. 26B is an outer housing cross section analysis prior to the material optimization of FIG. 26A.

FIGS. 26A and 26B show a composite cross section of the outer housing and joint central member. The lower drawing (FIG. 26B) illustrates an embodiment having a constant diameter shaft joining the mounting plane to the arm pivot axes plane. The upper drawing (FIG. 26A) illustrates an embodiment having a torsional strength and beam strength optimized configuration. The generally conical surface, S is a surface of revolution about the input shaft axis, Z. In one embodiment, the maximum outer diameter (OD) of the conical surface, at all axial cross sections, is limited by arm interference when operating a maximum joint angles. Both FIGS. 26A and 26B show outer housings having the same material thickness, t, which in one exemplary embodiment may be t=0.25 inches, though other material thicknesses may be used. Since the torsional stiffness is a function of diameter to the $4^{th}$ power, the shape of the conical surface, S, is capable of providing up to a potential 50% improvement of torsion stiffness with an appropriate I.D. hole. In addition, the conical shape may also provide up to a 100% increase in beam strength and a net weight reduction. In certain embodiments described herein, the central shaft optimization may be controlled by the shape of the link arm.

Outer Housing Optimization

The outer housing experiences loads that originate at the "A" attachment point to the arm pivot bearing shaft outer ends. These loads are both circumferential at right angles to the hub rotational axis, and in the axial direction, especially when the joint is operating at a maximum angle.

Referring again to FIGS. 26A and 26B, the diagram shows an optimized outer member cross-section, shown generally at 900, (FIG. 26A) through the housing centerline (℄) above the joint ℄, and a non-optimum outer housing, shown generally at 950, below the joint ℄ (FIG. 26B). By angling the inside of the outer housing surface 902 and the outside surface 904, the rigidity of the housing is markedly improved in all directions, and it is lighter. As in the case of the central member the arms partly determine the position and shape of the angled surfaces 902 and 904.

In one embodiment, the torsional stiffness of the housing is about 5 times the stiffness of the central member. The torsional stiffness further impacts the spatial accuracy of the arm pivot shafts and the spherical joint center locations when highly loaded.

Centering and Anti-Plunge Devices

In certain embodiments of the Harris CV coupling, the joint exhibits an axial plunging or axial length changing capability. In other embodiments, the use of additional components restricts or inhibits the axial movement. In certain embodiments, one limit on the total amount of axial plunge distance is component interference. By restricting the amount of axial plunge, the joint is kept away from its mechanical limits to prevent wear and potential damage.

In certain applications, the driver and driven shafts/hubs are fixed within bearings that are axially constrained and therefore the joint will run in one position without the need for any centering device or axially constraining member. In other applications, it may be beneficial for the joint to be self-limiting with respect to axial plunge. As shown in FIGS. 27-30 and described below, several embodiments of centering and anti-plunge structures keep the joint away from its axial displacement limits. The various embodiments of centering and anti-plunge structures may be varied and may depend on the specific application. Some of the embodiments described herein limit compression only, some induce extension (springs and pneumatic plungers), and others limit both the extension and compression of the joint.

Fixed Centering Devices for Limiting Extension and Compression

In many automotive applications a rotating axle will consist of two joints coupled by a shaft. Typically, a linkage determines the separation distance of the joints and varies as the linkage moves. This layout typifies a front wheel drive corner module where one of the joints typically does not extend or compress and the other is free to plunge therefore accommodating the length change needed. In the case of the fixed joint, a centering mechanism that does not allow the joint to plunge aids in providing maximum angulation because all components tend to be positioned optimally for maximum misalignment. In a front wheel-drive application, where the outboard joint is subject to the larger angular articulations and often times pivots about the kingpin centerline, typically a fixed joint is positioned on the outboard side of the shaft and the plunging joint on the inboard side. Two mechanical solutions for limiting both axial compression and extension are listed below.

Referring back to FIGS. 12 and 13, a Hooke Joint or Cardan Joint (u-joint) such as u-joint 428, may be utilized as a fixed centering structure. As shown, the u-joint may be mounted between the central members of the hubs. In one embodiment, the u-joint may be supported by bearings or bushings within the hubs to accommodate angular velocity variations inherent with u-joints operated at an angle.

Figure 27:
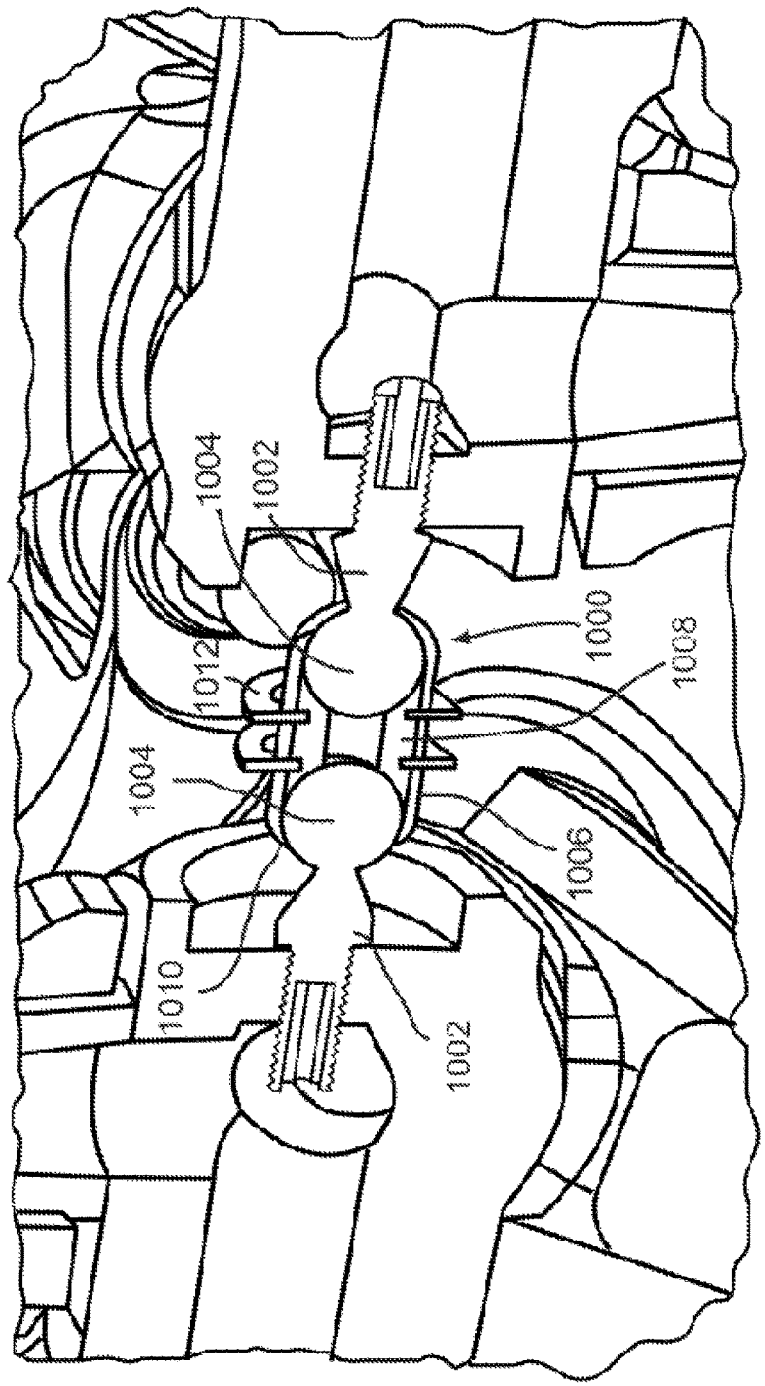
FIG. 27 is an enlarged, perspective, cross sectional view of an embodiment of a fixed centering device.

Referring to FIG. 27, an alternative embodiment of a centering package, shown generally at 1000, may be provided instead of a universal joint. In the embodiment of FIG. 27, a stud 1002 terminating in a spherical end 1004 is attached to each central driving member. The spherical ends 1002 extend into a sleeve 1006. A separating bushing 1008 contacts each spherical end 1002 to define a spaced apart relationship between the two CV couplings. An open end 1010 of the sleeve 1006 is closed around the rear surface of the spherical end 1002, either by an upsetting or crimping process or by way of a mechanical stop, such as a collar or snap rings 1012.

Extension Inducing Devices

Figure 28:
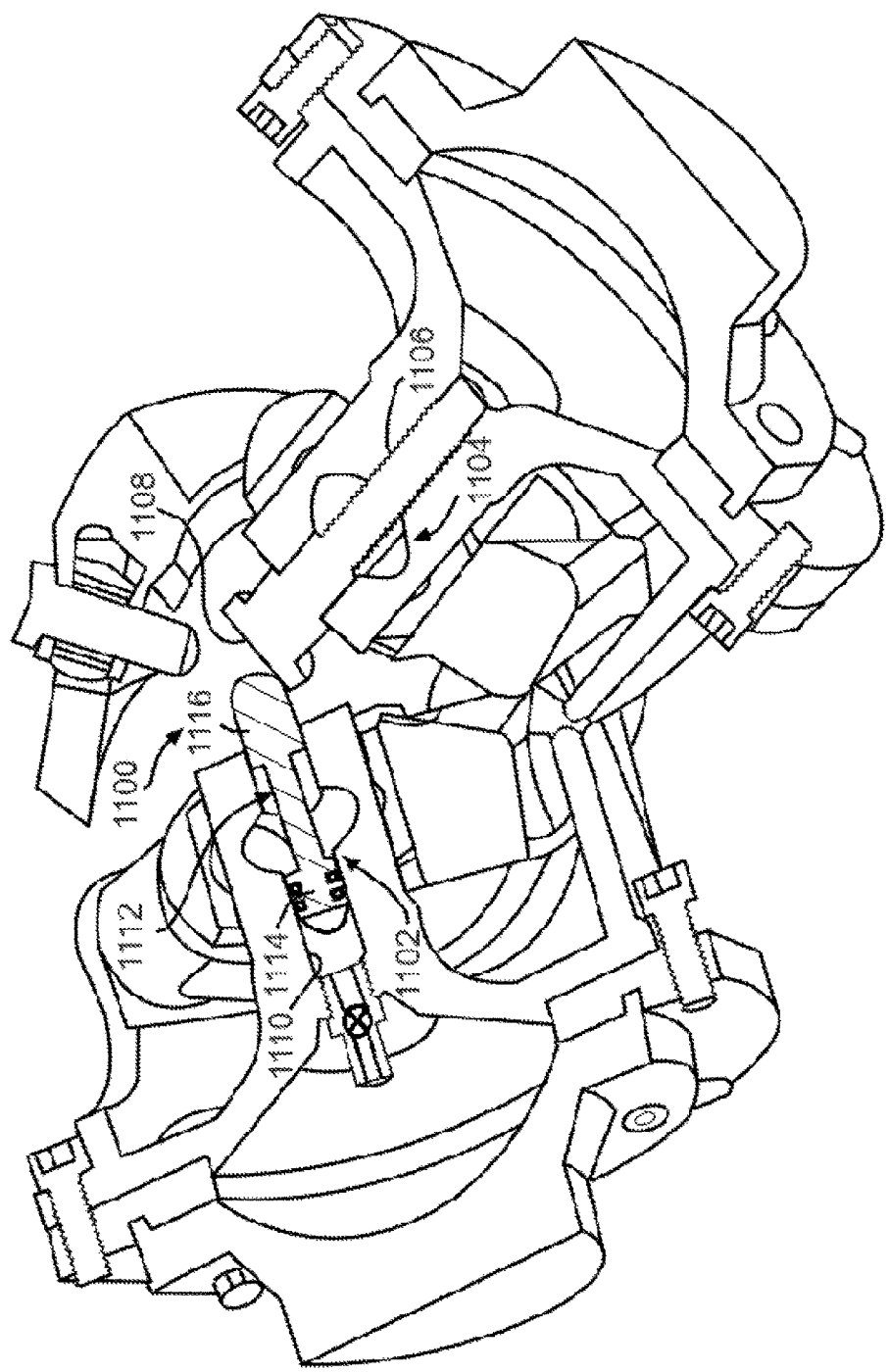
FIG. 28 is a perspective, cross sectional view of a seventh embodiment of a CV coupling having an axial extension device in accordance with the invention.
Figure 29:
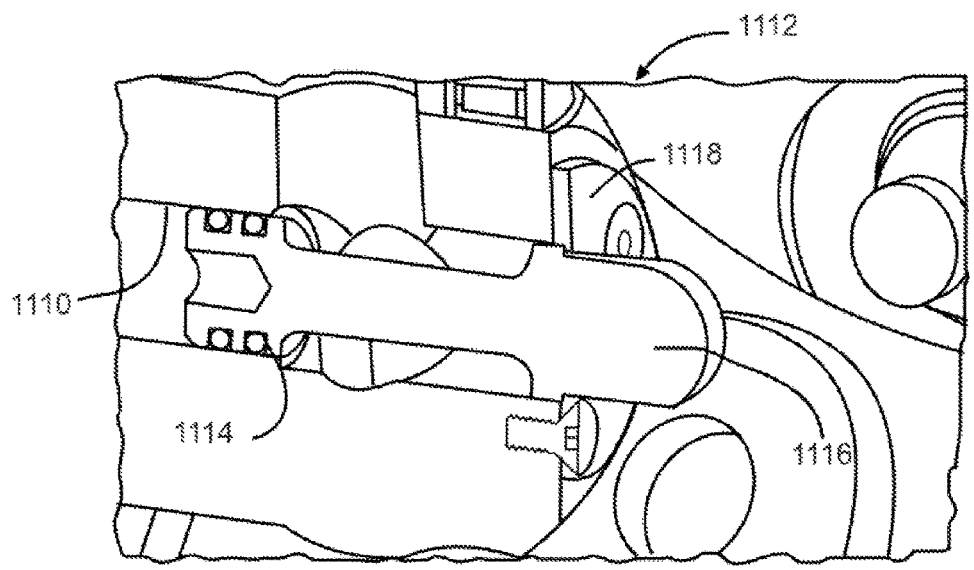
FIG. 29 is an enlarged view of a portion of the axial extension device of FIG. 28.

Referring now to FIGS. 28 and 29, there is illustrated an exemplary extension device. In some applications, providing a force to extend the joint can keep another component downstream pressed against a rigid surface. This results in a specific operating location, provided any opposing force does not overcome the extending mechanism. Using the automotive halfshaft as an example, the inboard rear joint could have a rigid bottoming device and the outboard joint could be loaded with a spring or pneumatic plunger which keeps the coupling shaft in compression holding the inner bottoming device in contact. In these cases a spring, spring loaded plunger, or pneumatic/hydraulic plunger would be located in the central member of the hubs.

As shown in FIGS. 28 and 29, an extension centering device 1100 includes a plunging end 1102 and a fixed end 1104. The fixed end 1104 may include an adjustment portion, such as a threaded section 1106 to provide an offset of a first contact head 1108 from the joint center or to establish a solid surface at the homokinetic plane. The plunging end 1102 includes a bore or cylinder 1110 and a plunger 1112 disposed in the bore 1110. The plunger 1112 includes a piston 1114 and a second contact head 1116. In one embodiment, the second contact head 1116 is rounded at the end such that rolling contact between the first and second contact heads 1008 and 1116 occurs as the joint articulates. The bore 1110 may be hydraulic fluid, or gas and may be pressurized or at an atmospheric pressure when the joint is in an axial rest position, i.e., not axially displaced. The plunger 1112 may be retained within the bore 1110 by a suitable retention mechanism, such as a snap ring or a retainer plate 1118, as shown in FIG. 29.

In addition to axially extending mechanisms that emerge from the central member, it is possible to attach torsional springs to the arm pivots which would torque the arm about its pin resulting in either an extending force or a retracting force if desired. It is noteworthy that in certain automotive applications, a specific operating axial location is not always necessary if the joint does not operate near its maximum allowable angle. The interconnecting shaft extending between two Harris joints can be free to axially move or float, as is the case with certain types of constant velocity joints. When two Harris joints are used on a common shaft centering forces counterbalance each other such that the shaft dynamically finds its center position. To aid in centering, two spring loaded (or pneumatic) plungers could be used on both sides of the axle to aid centering but still allow float.

Anti-Compression Devices

Figure 30:
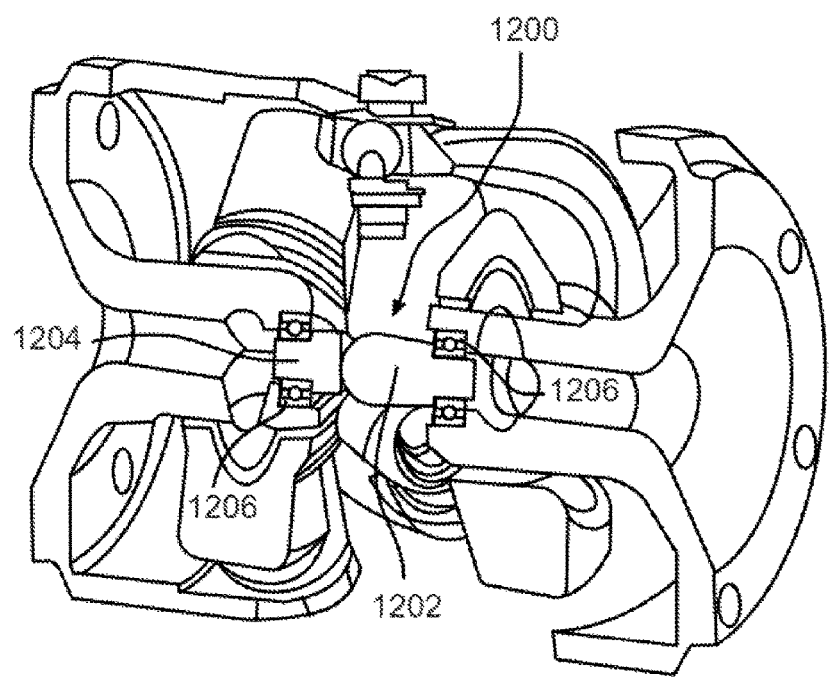
FIG. 30 is a perspective view of an eighth embodiment of a CV coupling having an anti-compression centering device in accordance with the invention.

Referring now to FIG. 30, there is illustrated an exemplary anti-compression or anti-plunging device, shown generally at 1200. In one embodiment, the anti-plunging device, configured to resist compression of the input and output joint halves, comprises a first shaft 1202 attached to one of the hubs central member and a second shaft 1204 attached to the other hubs central member. In the illustrated embodiment, the first shaft 1202 is configured with a domed contact surface, and the second shaft is configured with a flat surface. Alternatively, both first and second shafts 1202 and 1204 may have domed surfaces. The first and second shafts 1202 and 1204 are supported by bearing elements 1206, though such is not required. The shafts are constrained from compression deflections but are free to move away from one another. In one embodiment, the shafts 1202 and 1204 are positioned with a specific bottoming point that is in line with the homokinetic plane when the joint is positioned at least with no joint angle. Alternatively, the bottoming out point or compressive stop point may be any position between the linear range of movement of the joint. In the illustrated embodiment, the joint will pivot about a single point when held at the compressive stop position. This point may be the center of the radius on the domed shaft portion of the anti-plunge device. Alternatively, the pivot point at the compressive stop point may be the flat contact surface of the second shaft 1204. The bottoming stops can be integral to the central members of the hubs, supported by bearings as illustrated, or fastened to the central members. As mentioned above in relation to extension inducing devices, it may be beneficial to specify a limit to axial movement of the shaft, i.e., a backlash, and yet still permit the shaft to float between its limiting stops on both ends.

Basic Joint Geometry

Referring now to FIGS. 31A-31D, a two arm joint design illustrates the basic geometry of the Harris Coupling and the relative association of the various torque-transmitting components. The input and output shafts S1 and S2 are shown pivotally connected at pivot point Z0, which is coincident with the homokinetic plane. Other embodiments may not include the pivot point Z0. The input shaft S1 rotates about the input axis C1 and the output shaft S2 rotates about the output axis C2. The articulating arms A1 and A2 and their associated pivot point P1 represents the various embodiment of the articulating arms described above. The pivot point P1 coincides with the bearing element that interconnects the arms of the embodiments described above. The pivot point P1 is configured to permit articulation of the arms A1 and A2 as the joint rotates through 360 degrees at any angular orientation, θ (theta), within the joint angle capacity. The arms A1 and A2 rotate about axes AX1A and AX2A. The axes AX1A and AX2A of arm pair A1 and A2 are substantially perpendicular to the input and output shaft axes C1 and C2, respectively.

The basic joint geometry and load capacity may be further defined by the following dimensions. Distances B1 and B2 represent the offset of the arm centerline axes AX1A and AX2A from the homokinetic plane. In the embodiments illustrated herein, the offset distances B1 and B2 are substantially equal in length at all joint angles. Distances D1 and D2 are the bearing offsets from the homokinetic plane. These bearing, which may be a single bearing or multiple bearings, as described above, transmit torque from the input shaft S1 to the pivot point P1. These dimensions also represent an axial motion constraint on arms A1 and A2. During rotation of the joint, the distance from the end of A1 to axis C1, along axis AX1A remains generally constant. The same condition applies with respect to D2. Dimensions R1 and R2 represent the radial arm effective length as the distance between the pivot point P1 and the intersection of each arm rotational axis (AX1A and AX2A) with the respective shaft centerline, C1 and C2. In the illustrated embodiment, each arm segment length of a given arm pair is the same length, which places the pivot point P1 within the homokinetic plane. A plane defined by shaft centerline C1 and arm effective length R1 is generally perpendicular to a plane defined by the shaft centerline C1 and the arm axis AX1A. A similar orientation exists relative to arm effective length R2, shaft centerline C2 and arm axis AX2A.

The operation of the joint shown in FIG. 31A will be described in conjunction with a zero degree operating angle, unless otherwise noted. During operation, as the input shaft S1 rotates about axis C1, the axis AX1A rotates about C1 in a plane parallel to the homokinetic plane, PHK, as shown in FIGS. 31B-31D. Arm A1 is pivotally mounted and free to rotate about axis AX1A. The arm A1 extends to the pivot point P1 and the entire arm, including the portion coupled to pivot pint P1, is capable of rotating about axis AX1A. As arm A1 rotates, pivot point P1 transfers both motion and load to arm A2, which in turn, creates a torque on output shaft S2. In the illustrated embodiment, the center point Z0 is a pivotal attachment of shafts S1 and S2 and constrains the shafts from relative axial motion. When the operating angle is zero degrees, axes C1 and C2 form a straight line. As the shaft rotates through 360 degrees, point P1 rotates within the homokinetic plane, PHK. At a zero degree joint angle, the homokinetic plane is generally perpendicular to the input-output axis, C1-C2, as shown in FIGS. 31B-31D. As shown in FIG. 31B, an operating angle of 30 degrees is visible from the top view, which defines the plane of the true joint angle. The operating angle θ is the relative angular orientation of axis C1 to axis C2'. At angle, when shaft S1 is rotated through one revolution, the pivot P1 rotates within the homokinetic plane in the pattern of an oval or ellipse. The orientation of the homokinetic plane, PHK, is at half of the joint angle θ, which defines the characteristic of constant velocity motion.

Figure 31:
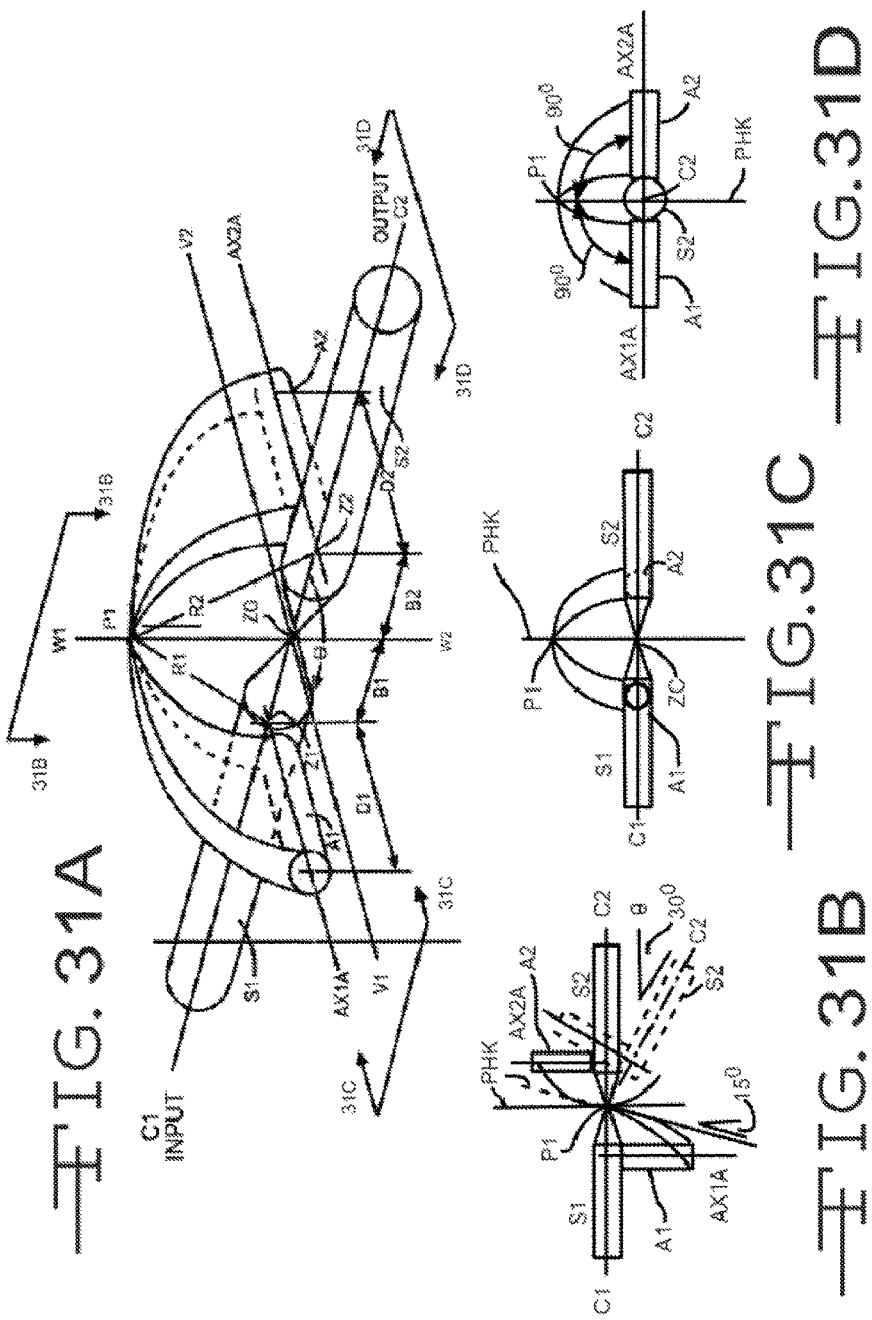
FIG. 31A is a geometric analysis through various planes of a two-arm embodiment of a CV coupling in accordance with the invention.
FIG. 31B is a top view layout of the two-arm CV coupling of FIG. 31A.
FIG. 31C is a side view layout of the two-arm CV coupling of FIG. 31A.
FIG. 31D is an end view layout of the two-arm CV coupling of FIG. 31A.

In another embodiment, the joint of FIG. 31A may include a second pair of arms identical to the first pair of arms A1 and A2. The second arm pair may be oriented 180 degrees from first arm pair A1 and A2 and may be coupled at a second pivot point that is opposite pivot point P1. When joints are configured with 1 or 2 arm pairs, in one embodiment the input and output shafts are pivotally connected together such that the joint is self supporting and the shafts are constrained from relative axial movement. In another embodiment, the input and output shafts are not pivotally connected together and the shafts may be supported by external structures, such as pillow block bearings for example, that constrain the relative axial movement of the joints. In yet another embodiment, three or more arm pairs may be oriented at generally equidistant radial angles from each other. With three or more arm pairs, the joint is self supporting and self centering which permits the shafts S1 and S2 to be either pivotally connected together or free to move axially relative to one another to accommodate a plunge capability. The interconnecting pivots of the arm pairs all reside and rotate within the homokinetic plane. Thus, the three arm pair joint can be configured to accommodate high operating angles and permit plunging capabilities.

Joint Design Considerations

As shown in FIGS. 32A, 32B, 34, 35, and 39, there are illustrated examples of estimated load and performance tables and figures that supplement the following design points.

Figure 33:
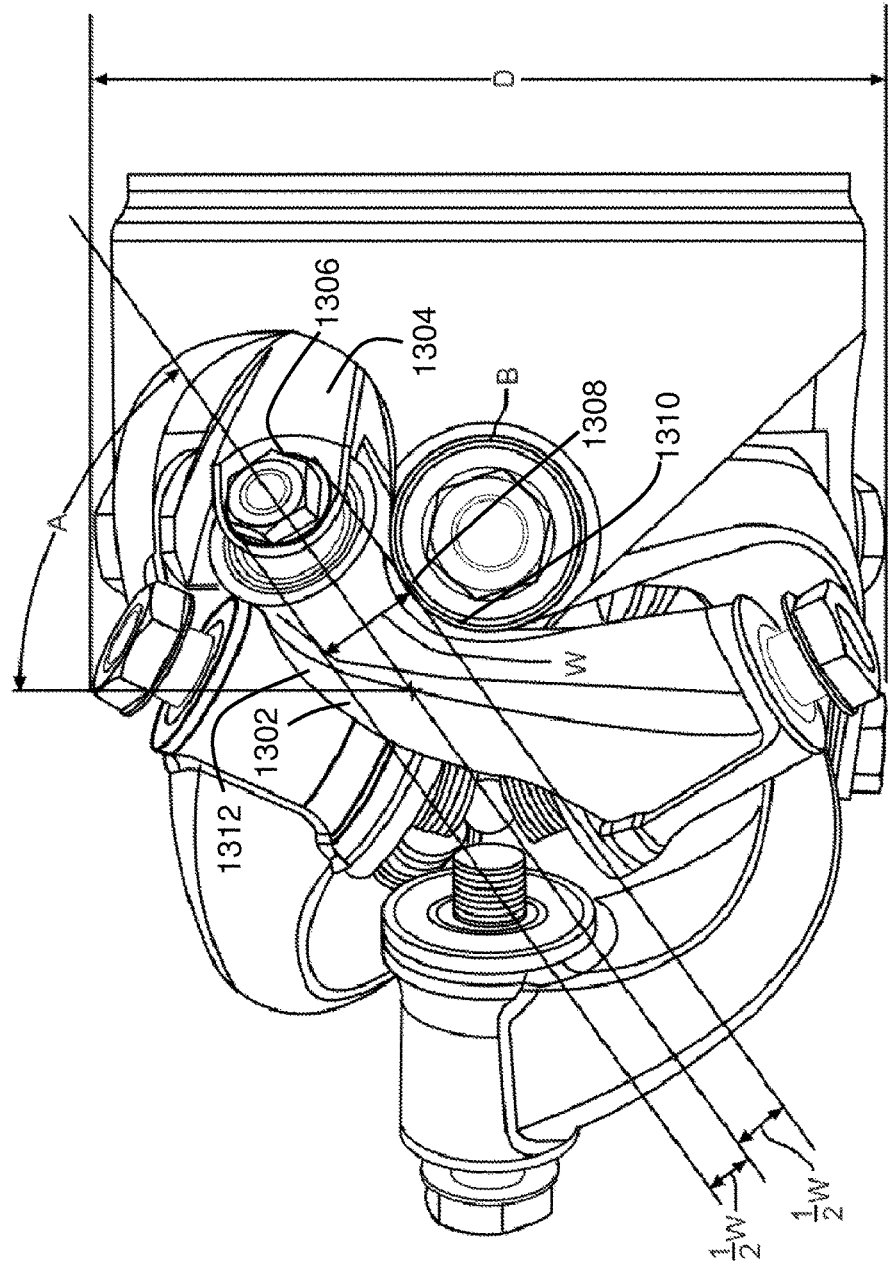
FIG. 33 is an illustration of a portion of a CV coupling having relative structural dimensions based on a joint swing diameter.
Figure 36:
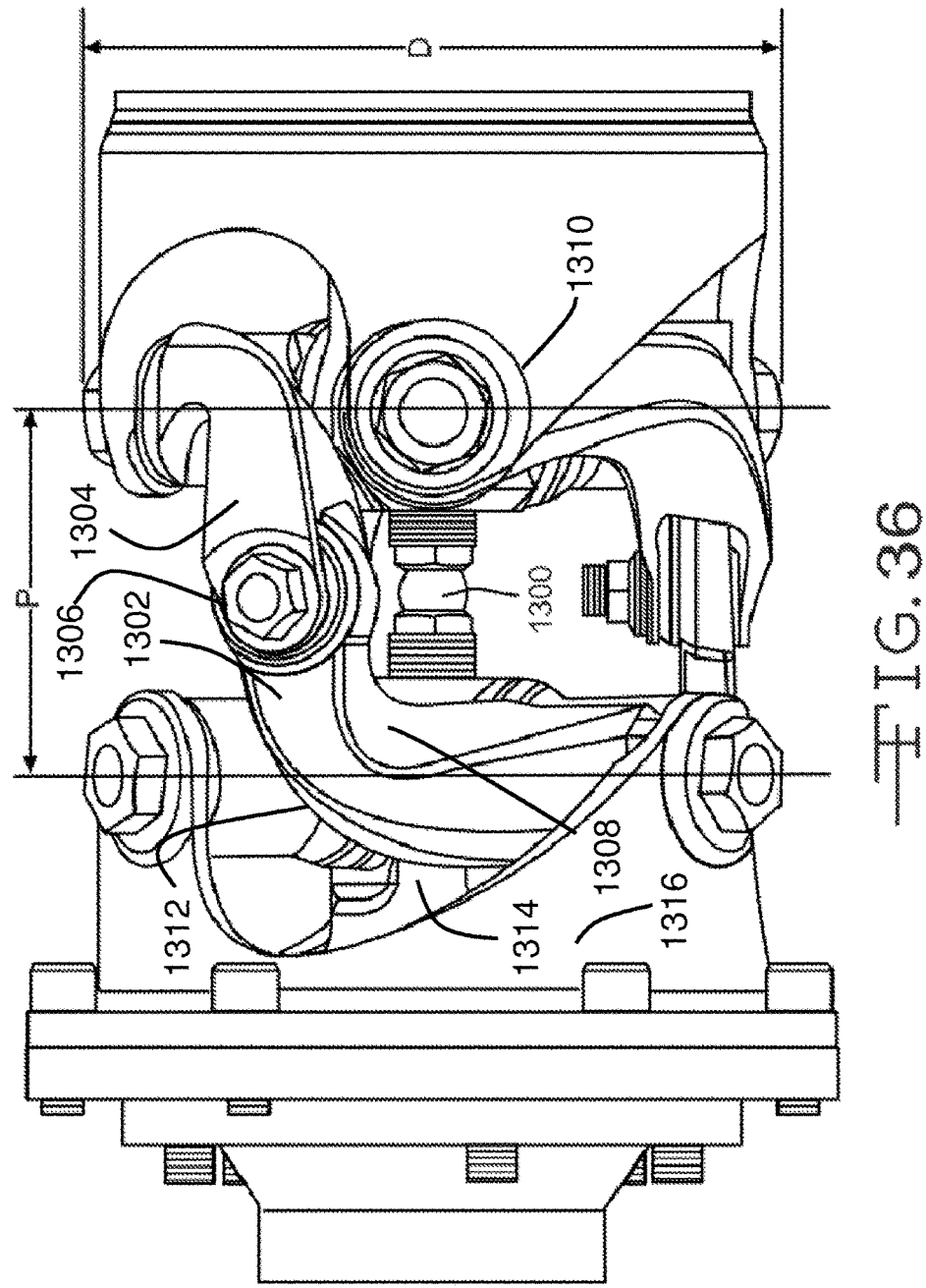
FIG. 36 is an illustration of an embodiment of a centered CV coupling showing a design plane separation dimensional relationship with the joint swing diameter of FIG. 33.
Figure 37A:
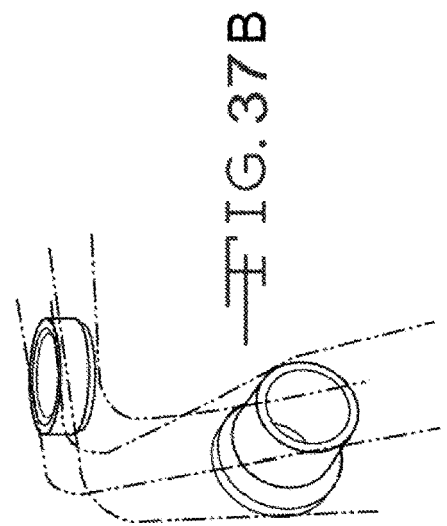
FIG. 37A is a perspective view of a CV coupling, articulated at a 65 degree angle, showing relative pivot bearing and arm interconnecting bearing and spatial relationships.
Figure 37B:
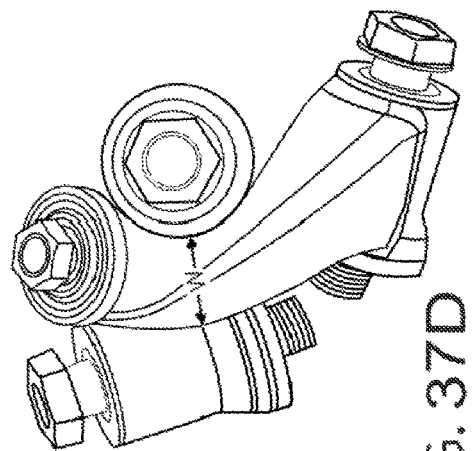
FIG. 37B is a schematic illustration of pivot arm design guide curves for a 65 degree joint angular capacity.
Figure 37C:
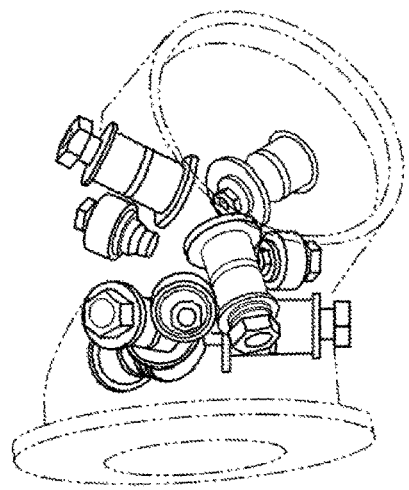
FIG. 37C is a schematic illustration of the relative size and spatial orientation of pivot and arm interconnecting bearings positioned at ends of the 65 degree guide curves.
Figure 37D:
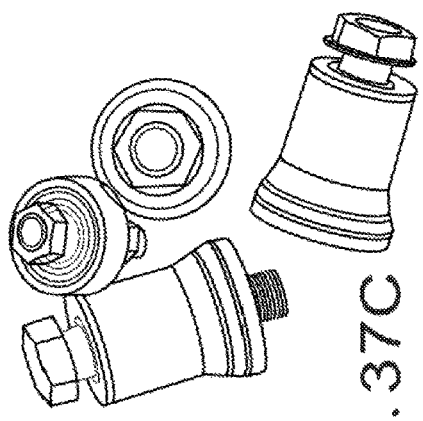
FIG. 37D is an illustration of a pivot arm constructed within the 65 degree guide curve of FIGS. 37B and 37C.

Loaded Areas of Consideration:

Design considerations of applied loading and friction are influential in the areas of the spherical arm connection point and the arm base pivot which rides on the driver/driven hubs. In one embodiment, these bearings may be a maximum for the established swing envelope in order to reduce bearing stress. As shown in FIG. 33, relative dimensions of bearings and arm thicknesses are tied to the swing diameter D. In one embodiment, the bearing diameter B may be defined as 0.25 D. An arm reference width, W, corresponding to the thinnest cross section area of the arm, may be 0.15 D. An arm curvature angle, A may define the angular orientation of the interconnecting pivot to the arm pivot base. The arm curvature angle A, determines the angle capability and static strength load capacity of the joint. Various joint angles and arm curvature angles are shown in FIGS. 34 and 35. As shown in FIG. 36, a pin plane separation distance, P, defines the spaced apart relationship of the arm bearing of an input joint portion to an output joint portion. In the illustrated embodiment, the pin plane separation is a function of the joint swing diameter D. In one particular embodiment, the pin plane separation, P is 0.5 D when the input and output joint sections are constrained by a single point rotation device 1300. FIGS. 33 and 36 show first and second arm segments 1302 and 1304 connected by an interconnecting pivot bearing element 1306, similar to the various arm and arm segments described above. The arm segment 1302 includes an inside radius 1308, at the thin section W that defines a surface intended to clear an arm pivot boss outer diameter 1310. The amount of clearance between the inside radius 1308 and the arm pivot boss outer diameter 1310 may create a contact condition at a maximum joint angle. The arm segment 1302 further defines an outside radius 1312 at the thin section W that limits angular articulation by contact with a central member 1314 and outer housing 1316. The arm segment 1302 may be pinched on both sides as the joint angle increases to the maximum angle.

The strength of the arm segment 1302 is related to the cross section defined at section W and the curvature angle A, shown in FIG. 33. An increase in the design of a maximum angle capability acts to increase the curvature angle A and decrease the cross section at section W. When considering a design of the Harris joint, pivot bearing diameters, joint arm maximum angle capability, torque capacity, arm curvature and cross section, and swing diameter are variables that are balanced to achieve a suitable structure. For example, for a given arm pivot bearing diameter and angle articulation capacity, increasing the swing diameter allows an increase in arm strength. For a given material, the increase in strength may be exponential. The increase in strength is due, in part to an increase in the cross sectional area at section W, a reduced curvature of the arm, and a decreased solidity ratio. It should be noted that the solidity ratio increases with decreasing joint diameter for a given joint torque capacity and arm bearing package size. It should also be noted that maximizing the torque capacity of the Harris joint in the smallest envelope relies on maximizing the solidity ratio at the maximum operating angle.

Spherical Arm Connection Point:

The spherical arm connection point is the interconnection point between two torque transmitting arms. This point is permitted to rotate about its axis, have axial misalignment, and resist radial and axial loads. In relative terms, this connection point will withstand large amounts of radial load and low to moderate amounts of axial load. When the Harris joint articulates it primarily rotates this connection about its axis and axial misalignment is minimal. In one embodiment, a spherical bearing may be used, though consideration of friction is a design factor. This consideration to address friction may include alternative lubricants, specialized low friction materials, rolling elements (i.e., spherical bearings with ID lined needle rollers), and angulation limits.

Arm Base Pivot:

The arm base pivot defines the connection between each pivot arm and the hub or central driving member. This connection point is configured to permit pivoting movement about an axis and resist axial and torsional loading. Dependent upon the joint power density desired, the axial and torsional loads at this connection point may become large. In one embodiment, cylindrical needle bearings in combination with thrust roller bearing may be provided. Alternatively, specialized low friction materials, such as for example polyamide-imide plastics may be used as thrust washer bearing elements. Additionally, ball bearings, which can resist both axial and radial loads may be used to reduce or eliminate the need for a bearing combination. Other embodiments of bearing elements, such as tapered roller bearings, bushings, etc. may also be used.

Spacing the two needle bearings apart much as possible, within a particular arm base portion, as can help to resist the torque and decrease bearing stress. When a torque load is applied, the offset cylindrical bearings are subjected to loads oriented in opposite directions. In addition, the loading of these bearings is not uniform along their length. Typically, the outside of the bearing is more heavily loaded and the inside of the bearing will see a load that decreases to zero as it approaches the neutral axis.

Spatial Constraints:

As best shown in FIGS. 37A-D, and 38A-B, when the Harris joint articulates as many as 6 of the 9 (for a 6 arm joint) connection points move close together at the closed side or inside area of the joint. In one embodiment shown in FIGS. 37A-37D, to provide an articulation angle of about 65 degrees, a ratio of joint swing diameter to the arm connection point diameter is about 4 to 1. Expressed differently, the individual connection point diameter is approximately ¼ the total swing diameter of the joint. In this embodiment, the spherical connection point and arm base pivot areas that are about equal in diameter.

Figure 32:
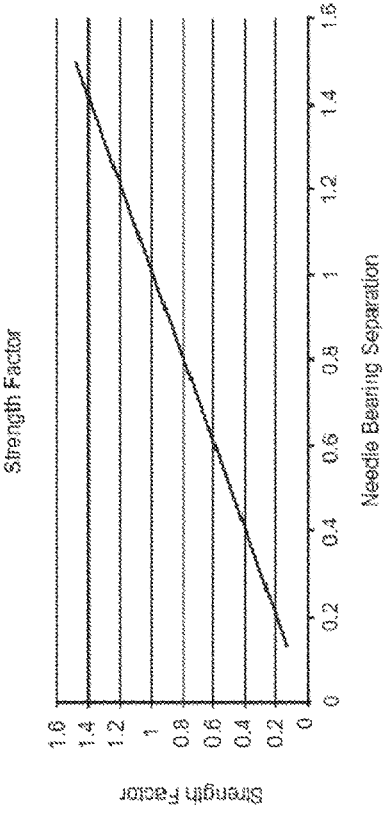
FIG. 32 B is a graph of strength factor vs. needle bearing separation from the table of FIG. 32A.

Bearing Optimization:

In designing the joint layout, it is desirable to space the arm base pivot bearings as far apart as practically allowable. Since both bearings lie on the same side of the joint, the theoretical maximum spacing is about ½ of the joint swing diameter. This is a theoretical value and includes assumptions that are not practical considerations. In practice, one embodiment of the joint may have a bearing spacing of approximately ¼ of the total joint swing diameter. A chart of exemplary arm pivot bearing spacing relative to spherical bearing swing radius is shown in FIGS. 32A and 32B.

Harris Joint design and Solidity Ratio construction

For the various designs of the Harris joint, efficient packaging of the torque transmitting components provides optimized designs that can be packaged in space limited environments, such as an automotive powertrain. At the outer bounds of packaging design, it is desirable to maximize the articulation angle and torque capacity in the smallest practical package. One design parameter is the torque density which is the ratio of torque carrying capacity to joint swing diameter. To maximize torque density, the available volume within the joint swing diameter is filled to its practical limit with structural material that transmits torque. Filling the available volume with material makes each of the components more rigid which promotes bearing alignment and mitigates rolling element pinching and skewing. We can refer to the available volume being filled with material as the solidity ratio of the joint. For all practical purposes, the higher the solidity ratio the higher the torque density. In addition to maximizing the solidity ratio for designing an efficiently packaged CV coupling, proper design considerations that consider factors such as fatigue, notch sensitivity, desired manufacturing processes and resultant material structure should still be followed. Designs that produce stress concentrations can reduce the efficiency of the structure. Achieving a high torque density improves packaging efficiency and makes the Harris joint competitive and relevant when considering other devices that are currently used in applications that require articulating torsional couplings (i.e. vehicle driveshafts). Due to the articulation of the joint and components that swing through space, the joint ends up with localized areas of high component density. These local regions are effectively what determine the maximum solidity ratio.

In order to transmit a large torque in a small package, the first component to be considered and designed (i.e., analyzed and superimposed within the available joint interior space) are the pivot bearings of the pivot arm mounts and the spherical or interconnecting bearings at the pivot arm connection point. Design considerations will balance the unit loading of each bearing within practical limits. A drastic imbalance of bearing strength may result in a weak link and premature failure or an inefficient design, meaning that one of the bearing areas is occupying more space than needed and decreases the available volume needed by the other bearings. If any of the bearings increase in diameter the others are forced to decrease. In one embodiment, a design constraint may be to include a double shear connection, shown in detail in FIG. 11, which supports both sides of the pivot arm interconnection point and has strength and bearing stability advantages.

Figure 38B:
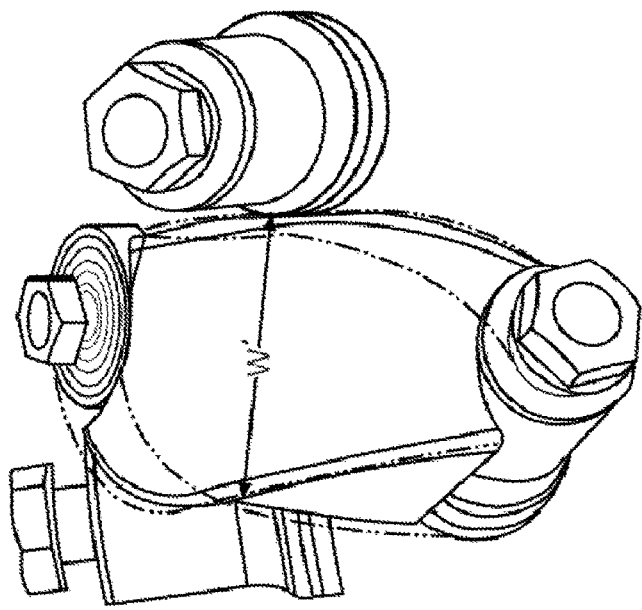
FIG. 38B is an illustration of a pivot arm constructed within the 20 degree guide curve of FIG. 38A.
Figure 38A:
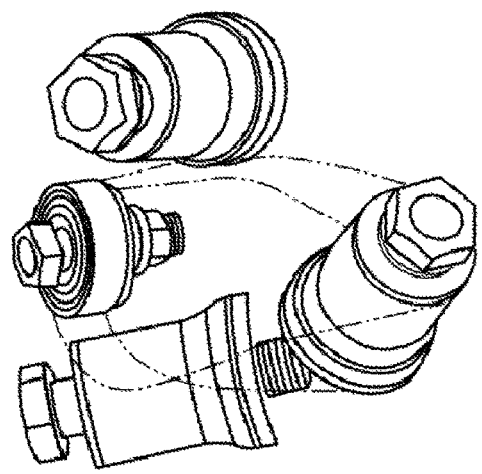
FIG. 38A is a schematic illustration of pivot arm design guide curves for a 20 degree joint capacity.

Once bearing types and diameters have been selected they can be placed in space with the joint at the maximum operating angle, as shown in FIGS. 37A-D. Hubs, illustrated in dashed lines, are shown for spatial reference. However, at this point in the design process the hubs typically have not been detailed. It should be noted that far less space is available for a joint that operates at high angle due to increased localized component density. For high angle joints (i.e. 65 degrees or greater) arm geometry is generally swept around other components to provide clearance. This provides a tradeoff of strength and rigidity for increased operating angle for a given swing diameter of the joint. Once the bearings have been placed in space at the maximum joint angle, the components at the apex of the joint, where component density is highest, can be isolated. FIGS. 37A-D show the guide curves for a 65 degree joint that represent the steps in joining the arm connection pivot to the arm base pivot. Two different arms are provided (quantity 3 each) for the particular variant shown, one which includes a ring to hold the outer race of the spherical bearing and another with a clevis to retain the ball of the spherical bearing. It should be noted that the guide curves for an arm in a joint that articulates less will have less curvature and will therefore be a more direct path resulting in a stronger and more rigid arm. FIGS. 38A and 38B provide a reference for how the arm geometry changes for a 20 degree joint versus a previously shown 65 degree joint. Despite the fact that more space is avaiable and more material can be used for a low angle joint, there is a tradeoff regarding the total mass of the components and their strength/rigidity. Once the arms have been designed and their sweep has been determined, a hub which provides clearance for them can be designed. A hub that provides minimal clearance to the sweeping arms will result in the shortest axial length possible.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A constant velocity coupling comprising:
a first central shaft and a plurality of first pivot arms pivotally connected to the first central shaft;
a second central shaft and a plurality of second pivot arms pivotally connected the second central shaft;
a first outer housing having a plurality of lugs, each of the plurality of lugs pivotally supporting one of the plurality of first pivot arms and connected to the first central shaft;
a second outer housing having a plurality of lugs, each of the plurality of lugs pivotally supporting one of the plurality of first pivot arms and connected to the second central shaft; and
an interconnecting bearing element coupling each of the first and second pivot arms together such that torque and rotary motion are transmitted through a joint angle.

2. The constant velocity coupling of claim 1 wherein the plurality of first and second arms define complementary curvatures associated with adjacent arm pivot connections that define a maximum joint angle capacity within a joint swing diameter.

3. The constant velocity coupling of claim 2 wherein the interconnecting bearing element is a clevis bearing element.

4. The constant velocity coupling of claim 1 wherein the interconnecting bearing element is a spherical bearing element disposed in each of the plurality of first pivot arms and the plurality of second pivot arms each include a bore to receive an outer race portion of the spherical bearing element.

5. The constant velocity coupling of claim 1 wherein the interconnecting bearing element is a spherical bearing element and one of the first and second pivot arms terminates in a yoke end that engages opposite ends of an inner race portion of the spherical bearing element.

6. The constant velocity coupling of claim 1 wherein the plurality of lugs of the first and second outer housings each having a bore in alignment with the first and second pivot arms pivotally supported on the first and second central shafts.

7. The constant velocity coupling of claim 1 wherein at least one of the first and second central shafts is integrally formed with the respective one of the first and second outer housings.

8. The constant velocity coupling of claim 1 wherein the plurality of first pivot arms are pivotally connected to the first central shaft through a plurality of column bearing elements each compressed between one of the plurality of lugs and a corresponding face of the first central shaft.

9. The constant velocity coupling of claim 1 wherein the plurality of first pivot arms are pivotally connected to the first central shaft through a plurality of threaded fasteners secured to the first central shaft.

10. The constant velocity coupling of claim 1 wherein the plurality of first pivot arms are pivotally connected to the first central shaft through a journal spider.

11. The constant velocity coupling of claim 1 wherein a centering device is supported by the first and second central shafts, the centering device configured to restrict relative extending and compressing axial movement of the first and second central shafts.

12. The constant velocity joint of claim 11 wherein the centering device is a Cardan joint.

13. The constant velocity joint of claim 11 wherein the centering device includes a first stud terminating in a spherical end supported by the first central shaft and a second stud terminating in a spherical end supported by the second central shaft, the first and second studs interconnected by a sleeve.

14. The constant velocity coupling of claim 1 wherein a centering device is supported by the first and second central shafts, the centering device configured to restrict relative compressing axial movement of the first and second central shafts and permit relative extending axial movement of the first and second central shafts.

15. The constant velocity coupling of claim 1 wherein a centering device is supported by the first and second central shafts, the centering device configured to generate an extending force on the first and second central shafts.

\* \* \* \* \*